US010237656B2

(12) United States Patent
Lee et al.

(10) Patent No.: US 10,237,656 B2
(45) Date of Patent: Mar. 19, 2019

(54) PANEL VIBRATION TYPE SOUND GENERATING DISPLAY DEVICE

(71) Applicant: LG DISPLAY CO., LTD., Seoul (KR)

(72) Inventors: Sungtae Lee, Incheon (KR); YeongRak Choi, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 15/471,173

(22) Filed: Mar. 28, 2017

(65) Prior Publication Data

US 2017/0280216 A1    Sep. 28, 2017

(30) Foreign Application Priority Data

Mar. 28, 2016 (KR) .................. 10-2016-0037118
Apr. 4, 2016 (KR) .................. 10-2016-0040885
Apr. 5, 2016 (KR) .................. 10-2016-0041384
May 30, 2016 (KR) .................. 10-2016-0066455
May 31, 2016 (KR) .................. 10-2016-0067431
Jun. 30, 2016 (KR) .................. 10-2016-0083122

(Continued)

(51) Int. Cl.
*H04R 1/02* (2006.01)
*H04R 5/02* (2006.01)
(Continued)

(52) U.S. Cl.
CPC .............. *H04R 5/02* (2013.01); *H04N 5/642* (2013.01); *H04R 1/025* (2013.01); *H04R 1/028* (2013.01);
(Continued)

(58) Field of Classification Search
CPC ........ H04R 1/028; H04R 1/288; H04R 11/02; H04R 5/02; H04R 1/025; H04R 1/26;
(Continued)

(56) References Cited

U.S. PATENT DOCUMENTS 4,891,842 A    1/1990  Green
5,025,474 A    6/1991  Tanaka et al.
(Continued)

FOREIGN PATENT DOCUMENTS

CN         1547416 A    11/2004
CN       102946577 A     2/2013
(Continued)

OTHER PUBLICATIONS

U.S. Appl. No. 15/374,566, filed Dec. 9, 2016.
(Continued)

*Primary Examiner* — Disler Paul
(74) *Attorney, Agent, or Firm* — Morgan, Lewis & Bockius LLP

(57) ABSTRACT

A display device includes a display panel having first, second, and third areas; at least three sound generating actuators including first, second, and third actuators each spaced apart from the other two in a long axis direction of the display panel, wherein the first, second, and third actuators each contact the display panel at the first, second, and third areas, respectively, to generate sound by vibrating the display panel; and a support structure at a rear side of the display panel configured to support the at least three sound generating actuators.

17 Claims, 28 Drawing Sheets

(30) Foreign Application Priority Data

| | | |
|---|---|---|
| Nov. 30, 2016 | (KR) | 10-2016-0161789 |
| Nov. 30, 2016 | (KR) | 10-2016-0162189 |
| Dec. 30, 2016 | (KR) | 10-2016-0183867 |

(51) Int. Cl.

| | |
|---|---|
| *H04R 9/06* | (2006.01) |
| *H04N 5/64* | (2006.01) |
| *H04R 1/28* | (2006.01) |
| *H04R 11/02* | (2006.01) |
| *H04R 9/02* | (2006.01) |
| *H04R 3/14* | (2006.01) |
| *H04R 1/26* | (2006.01) |
| *H04R 7/04* | (2006.01) |

(52) U.S. Cl.
CPC ............ *H04R 1/26* (2013.01); *H04R 1/288* (2013.01); *H04R 3/14* (2013.01); *H04R 7/045* (2013.01); *H04R 9/025* (2013.01); *H04R 9/06* (2013.01); *H04R 9/066* (2013.01); *H04R 11/02* (2013.01); *H04R 5/023* (2013.01); *H04R 2307/023* (2013.01); *H04R 2307/025* (2013.01); *H04R 2400/03* (2013.01); *H04R 2440/05* (2013.01); *H04R 2499/15* (2013.01)

(58) Field of Classification Search
CPC ............ H04R 2440/05; H04R 2499/15; H04R 2307/023; H04R 2400/03; H04R 9/025; H04R 9/066
USPC .................................................. 381/333, 306
See application file for complete search history.

(56) References Cited

U.S. PATENT DOCUMENTS

| | | | |
|---|---|---|---|
| 5,796,854 | A | 8/1998 | Markow |
| 6,137,890 | A | 10/2000 | Markow |
| 6,208,237 | B1 | 3/2001 | Saiki et al. |
| 6,238,755 | B1 | 5/2001 | Harvey et al. |
| 6,342,831 | B1 | 1/2002 | Azima |
| 6,443,586 | B1 | 9/2002 | Azima et al. |
| 6,610,237 | B2 | 8/2003 | Azima et al. |
| 6,618,487 | B1 | 9/2003 | Azima et al. |
| 6,677,384 | B1 | 1/2004 | Ikemoto et al. |
| 6,751,329 | B2 | 6/2004 | Colloms et al. |
| 6,795,561 | B1 | 9/2004 | Bank |
| 6,826,285 | B2 | 11/2004 | Azima |
| 6,871,149 | B2 | 3/2005 | Sullivan et al. |
| 6,911,901 | B2 | 6/2005 | Bown |
| 6,922,642 | B2 | 7/2005 | Sullivan |
| 6,937,124 | B1 | 8/2005 | Nakamura et al. |
| 6,956,957 | B1 * | 10/2005 | Azima ............... H04R 9/06 181/169 |
| 6,985,596 | B2 | 1/2006 | Bank et al. |
| 7,020,302 | B2 | 3/2006 | Konishi et al. |
| 7,050,600 | B2 | 5/2006 | Saiki et al. |
| 7,120,264 | B2 | 10/2006 | Saiki et al. |
| 7,157,649 | B2 | 1/2007 | Hill |
| 7,158,651 | B2 | 1/2007 | Bachmann et al. |
| 7,174,025 | B2 | 2/2007 | Azima et al. |
| 7,184,898 | B2 | 2/2007 | Sullivan et al. |
| 7,215,329 | B2 | 5/2007 | Yoshikawa et al. |
| 7,305,248 | B2 | 12/2007 | Mori |
| 7,372,110 | B2 | 5/2008 | Hatano |
| 7,376,523 | B2 | 5/2008 | Sullivan et al. |
| 7,382,890 | B2 | 6/2008 | Saiki et al. |
| 7,536,211 | B2 | 5/2009 | Saiki et al. |
| 7,545,459 | B2 | 6/2009 | Fujiwara et al. |
| 7,564,984 | B2 | 7/2009 | Bank et al. |
| 7,570,771 | B2 | 8/2009 | Whitwell et al. |
| 7,593,159 | B2 | 9/2009 | Yokoyama et al. |
| 7,657,042 | B2 | 2/2010 | Miyata |
| 7,764,803 | B2 | 7/2010 | Kang |
| 7,769,191 | B2 | 8/2010 | Lee et al. |
| 7,800,702 | B2 | 9/2010 | Tsuboi et al. |
| 7,903,091 | B2 | 3/2011 | Lee et al. |
| 8,174,495 | B2 | 5/2012 | Takashima et al. |
| 8,174,511 | B2 | 5/2012 | Takenaka et al. |
| 8,180,074 | B2 | 5/2012 | Ko et al. |
| 8,194,894 | B2 | 6/2012 | Burton et al. |
| 8,274,480 | B2 | 9/2012 | Sullivan |
| 8,736,558 | B2 | 5/2014 | East et al. |
| 8,830,211 | B2 | 9/2014 | Hill |
| 8,879,766 | B1 | 11/2014 | Zhang |
| 8,917,168 | B2 | 12/2014 | Kono et al. |
| 8,934,228 | B2 | 1/2015 | Franklin et al. |
| 9,001,060 | B2 | 4/2015 | Harris |
| 9,030,447 | B2 | 5/2015 | Hsu |
| 9,035,918 | B2 | 5/2015 | Harris et al. |
| 9,041,662 | B2 | 5/2015 | Harris |
| 9,046,949 | B2 | 6/2015 | Adachi et al. |
| 9,107,006 | B2 | 8/2015 | Wang et al. |
| 9,122,011 | B2 | 9/2015 | Oh et al. |
| 9,137,592 | B2 | 9/2015 | Yliaho et al. |
| 9,148,716 | B2 | 9/2015 | Liu et al. |
| 9,173,014 | B2 | 10/2015 | Park |
| 9,191,749 | B2 | 11/2015 | Nabata et al. |
| 9,197,966 | B2 | 11/2015 | Umehara et al. |
| 9,204,223 | B2 | 12/2015 | Nabata et al. |
| 9,285,882 | B2 | 3/2016 | Wang et al. |
| 9,288,564 | B2 | 3/2016 | Faerstain et al. |
| 9,300,770 | B2 | 3/2016 | Nabata et al. |
| 9,317,063 | B2 | 4/2016 | Kwon et al. |
| 9,332,098 | B2 | 5/2016 | Horii |
| 9,350,832 | B2 | 5/2016 | Horii |
| 9,357,280 | B2 | 5/2016 | Mellow et al. |
| 9,363,591 | B2 | 6/2016 | Ozasa et al. |
| 9,363,607 | B2 | 6/2016 | Ando |
| 9,380,366 | B2 | 6/2016 | Kang et al. |
| 9,389,688 | B2 | 7/2016 | Tossavainen et al. |
| 9,398,358 | B2 | 7/2016 | Louh |
| 9,436,320 | B2 | 9/2016 | Kang et al. |
| 9,544,671 | B2 | 1/2017 | Shi et al. |
| 9,609,438 | B2 | 3/2017 | Kim et al. |
| 9,654,863 | B2 | 5/2017 | Crosby et al. |
| 2001/0040976 | A1 | 11/2001 | Buos |
| 2001/0043714 | A1 | 11/2001 | Asada et al. |
| 2003/0233794 | A1 | 12/2003 | Pylkki et al. |
| 2005/0129258 | A1 * | 6/2005 | Fincham ............... H04S 1/002 381/160 |
| 2005/0129265 | A1 | 6/2005 | Nakajima et al. |
| 2006/0018503 | A1 | 1/2006 | Endo |
| 2006/0078153 | A1 | 4/2006 | Sato |
| 2006/0120542 | A1 * | 6/2006 | Lee ............... H04R 7/045 381/152 |
| 2006/0126885 | A1 | 6/2006 | Combest |
| 2006/0140439 | A1 | 6/2006 | Nakagawa |
| 2007/0019134 | A1 | 1/2007 | Park et al. |
| 2007/0036388 | A1 * | 2/2007 | Lee ............... H04R 1/26 381/431 |
| 2007/0187172 | A1 | 8/2007 | Kaneda et al. |
| 2007/0206822 | A1 * | 9/2007 | Whitwell ............... H04R 1/24 381/152 |
| 2007/0290609 | A1 | 12/2007 | Ishii et al. |
| 2009/0034174 | A1 | 2/2009 | Ko et al. |
| 2009/0034759 | A1 | 2/2009 | Ko et al. |
| 2009/0097692 | A1 | 4/2009 | Sakamoto |
| 2009/0247237 | A1 | 10/2009 | Mittleman et al. |
| 2009/0267891 | A1 | 10/2009 | Ali |
| 2012/0034541 | A1 | 2/2012 | Muraoka et al. |
| 2012/0242592 | A1 | 9/2012 | Rothkopf et al. |
| 2012/0243719 | A1 | 9/2012 | Franklin et al. |
| 2012/0274570 | A1 | 11/2012 | Kim |
| 2013/0089231 | A1 | 4/2013 | Wilk et al. |
| 2013/0106868 | A1 | 5/2013 | Shenoy |
| 2013/0250169 | A1 | 9/2013 | Kim |
| 2014/0029777 | A1 | 1/2014 | Jang |
| 2014/0049522 | A1 | 2/2014 | Mathew et al. |
| 2014/0145836 | A1 | 5/2014 | Tossavainen et al. |
| 2014/0146093 | A1 | 5/2014 | Sako et al. |
| 2014/0197380 | A1 | 7/2014 | Sung et al. |

(56) References Cited

U.S. PATENT DOCUMENTS

| | | |
|---|---|---|
| 2014/0326402 A1 | 11/2014 | Lee et al. |
| 2014/0334078 A1 | 11/2014 | Lee et al. |
| 2015/0010187 A1 | 1/2015 | Lee et al. |
| 2015/0016658 A1 | 1/2015 | Lee |
| 2015/0062101 A1 | 3/2015 | Kim et al. |
| 2015/0078604 A1 | 3/2015 | Seo et al. |
| 2015/0119834 A1 | 4/2015 | Locke et al. |
| 2015/0138157 A1 | 5/2015 | Harris et al. |
| 2015/0195630 A1 | 7/2015 | Yliaho et al. |
| 2015/0341714 A1* | 11/2015 | Ahn ............... G06F 1/1688 381/333 |
| 2015/0350775 A1 | 12/2015 | Behles et al. |
| 2016/0011442 A1 | 1/2016 | Lee et al. |
| 2016/0050472 A1 | 2/2016 | Lee et al. |
| 2016/0212513 A1 | 7/2016 | Honda et al. |
| 2016/0261966 A1 | 9/2016 | Won |
| 2016/0345102 A1 | 11/2016 | Tagami et al. |
| 2017/0070811 A1* | 3/2017 | Mihelich ............ H04R 1/2857 |
| 2017/0280216 A1 | 9/2017 | Lee et al. |

FOREIGN PATENT DOCUMENTS

| | | |
|---|---|---|
| CN | 105096778 A | 11/2015 |
| EP | 1 507 438 A2 | 2/2005 |
| EP | 1881731 A1 | 1/2008 |
| EP | 2947857 A2 | 11/2015 |
| JP | 55-25284 A | 2/1980 |
| JP | H02-001987 U | 1/1990 |
| JP | H03-132296 A | 6/1991 |
| JP | 2696801 B2 | 1/1998 |
| JP | H11-44891 A | 2/1999 |
| JP | 2001-61194 A | 3/2001 |
| JP | 2002-511681 A | 4/2002 |
| JP | 2002-264646 A | 9/2002 |
| JP | 2003-211087 A | 7/2003 |
| JP | 3578244 B2 | 10/2004 |
| JP | 2004-343362 A | 12/2004 |
| JP | 2005-175553 A | 6/2005 |
| JP | 2005-244804 A | 9/2005 |
| JP | 2006-138149 A | 6/2006 |
| JP | 2006-186590 A | 7/2006 |
| JP | 2006-319626 A | 11/2006 |
| JP | 2006-325079 A | 11/2006 |
| JP | 3896675 B2 | 3/2007 |
| JP | 2007-267302 A | 10/2007 |
| JP | 2007/528648 A | 10/2007 |
| JP | 2007-300578 A | 11/2007 |
| JP | 2009-100223 A | 5/2009 |
| JP | 2009100223 A | 5/2009 |
| JP | 2009200334 A | 5/2009 |
| JP | 2009/302924 A | 12/2009 |
| JP | 2010-027845 A | 2/2010 |
| JP | 2010-081142 A | 4/2010 |
| JP | 4449605 B2 | 4/2010 |
| JP | 2011-123696 A | 6/2011 |
| JP | 2012-129247 A | 7/2012 |
| JP | 2012-198407 A | 10/2012 |
| JP | 5060443 B2 | 10/2012 |
| JP | 2013-044912 A | 3/2013 |
| JP | 2013-102360 A | 5/2013 |
| JP | 2014-509028 A | 4/2014 |
| JP | 2014-220237 A | 11/2014 |
| JP | 2014-220802 A | 11/2014 |
| JP | 2015-219528 A | 12/2015 |
| KR | 10-2008-0002228 A | 1/2008 |
| KR | 2008-0063698 A | 7/2008 |
| KR | 10-1026987 B1 | 4/2011 |
| KR | 10-1061519 B1 | 9/2011 |
| KR | 10-1404119 B1 | 6/2014 |
| KR | 101410393 B2 | 6/2014 |
| KR | 2015-0005089 A | 1/2015 |
| KR | 10-2015-0031641 A | 3/2015 |
| KR | 10-1499514 B1 | 3/2015 |
| KR | 10-2015-0131428 A | 11/2015 |
| KR | 2015-133918 A | 12/2015 |
| KR | 10-2017-0135673 A | 12/2017 |
| TW | 200706049 A | 2/2007 |
| TW | M451766 U | 4/2013 |
| TW | 201319783 A | 5/2013 |
| TW | 201503710 A | 1/2015 |
| TW | 201545559 A | 12/2015 |
| WO | 99/52322 A1 | 10/1999 |
| WO | 2005/089014 A1 | 9/2005 |
| WO | 2009/017280 A1 | 2/2009 |
| WO | 2012/129247 A2 | 9/2012 |
| WO | 2015-046288 A1 | 4/2015 |
| WO | 2016/002230 A1 | 1/2016 |

OTHER PUBLICATIONS

U.S. Appl. No. 15/388,939, filed Dec. 22, 2016.
U.S. Appl. No. 15/340,709, filed Nov. 1, 2016.
U.S. Appl. No. 15/471,458, filed Mar. 28, 2017.
U.S. Appl. No. 15/471,431, filed Mar. 28, 2017.
U.S. Appl. No. 15/471,184, filed Mar. 28, 2017.
U.S. Appl. No. 15/471,155, filed Mar. 28, 2017.
U.S. Appl. No. 15/471,164, filed Mar. 28, 2017.
U.S. Appl. No. 15/471,173, filed Mar. 28, 2017.
Communication dated Jun. 30, 2017 from the European Patent Office in related European application No. 16181195.5.
Office Action dated Sep. 26, 2017 from the Japanese Patent Office in related Japanese application No. 2016-190615.
Office Action dated Oct. 3, 2017 from the Japanese Patent Office in related Japanese application No. 2016-235794.
Communication dated Sep. 19, 2017 from the European Patent Office in related European application No. 16181185.6.
Communication dated Sep. 5, 2017 from the European Patent Office in related European application No. 16181191.4.
Office Action dated Mar. 27, 2017, from the Korean Patent Office in related Application No. 10-2016-0146951.
Extended European Search Report issued in European Application No. 17183078.9 dated Jan. 16, 2018.
Extended European Search Report issued in European Application No. 17184428.5 dated Jan. 23, 2018.
Extended European Search Report issued in European Application No. 17184429.3 dated Jan. 26, 2018.
Japanese Office Action issued in Japanese Application No. 2016-216426 dated Nov. 24, 2017.
Taiwanese Office Action issued in Taiwanese Application No. 10720014270 dated Jan. 10, 2018.
Taiwanese Office Action issued in Taiwanese Application No. 10621325350 dated Jan. 3, 2018.
USPTO Office Action dated Sep. 8, 2017 in related U.S. Appl. No. 15/374,566.
USPTO Office Action dated Oct. 26, 2017 in related U.S. Appl. No. 15/471,458.
USPTO Office Action dated Nov. 9, 2017 in related U.S. Appl. No. 15/471,173.
USPTO Office Action dated Aug. 10, 2017 in related U.S. Appl. No. 15/340,709.
USPTO Office Action dated Oct. 13, 2017 in related U.S. Appl. No. 15/471,184.
Hermida, Alfred, "PC Screen Turns Into Speaker," BBC News, Technology, Mar. 31, 2003, pp. 1-2.
Office Action dated May 31, 2017, from the Taiwanese Patent Office in related Taiwanese Patent Application No. 106121605.
Taiwanese Office Action dated May 15, 2018, issued in Taiwanese Application No. 106122586.
Japanese Office Action dated Jul. 3, 2018, issued in Japanese Application No. 2016-235794.
Japanese Office Action dated Jun. 5, 2018, issued in Japanese Application No. 2017-131154.
Office Action dated May 31, 2017, from the Taiwanese Patent Office in related Application No. 106121605.
Japanese Office Action dated Aug. 23, 2018, issued in Japanese Application No. 2017-137757.

(56) References Cited

OTHER PUBLICATIONS

Japanese Office Action dated Aug. 23, 2018, issued in Japanese Application No. 2017-124022.
Japanese Office Action dated Sep. 25, 2018, issued in Japanese Application No. 2017-131143.
U.S. Office Action dated Dec. 13, 2018, issued in U.S. Appl. No. 15/785,397.
***Note: 9,818,805 B2 cited in the Office Action is the issued patent for related U.S. Appl. No. 15/388,939, which was cited in the IDS Transmittal filed on Apr. 28, 2017, and is therefore not included here because the record would be cumulative. U.S. Appl. No. 15/785,397 is a continuation of U.S. Appl. No. 15/388,939.
Office Action dated Dec. 11, 2018, issued in Japanese Patent Application No. 2017-131154.
U.S. Office Action dated Dec. 13, 2018, issued in U.S. Appl. No. 15/987,267.
Non-final Office Action from the U.S. Patent and Trademark Office Issued in U.S. Appl. No. 16/038,075 dated Jan. 18, 2019.

* cited by examiner

PANEL VIBRATION TYPE SOUND GENERATING DISPLAY DEVICE

This application claims the priority of Korean Application No. 10-2016-0037118, filed Mar. 28, 2016, Korean Application No. 10-2016-0040885, filed Apr. 4, 2016, Korean Application No. 10-2016-0041384, filed Apr. 5, 2016, Korean Application No. 10-2016-0066455, filed May 30, 2016, Korean Application No. 10-2016-0067431, filed May 31, 2016, Korean Application No. 10-2016-0083122, filed Jun. 30, 2016, Korean Application No. 10-2016-0161789, filed Nov. 30, 2016, Korean Application No. 10-2016-0162189, filed Nov. 30, 2016, and Korean Application No. 10-2016-0183867, filed Dec. 30, 2016, all of which are hereby incorporated by reference.

BACKGROUND

Technical Field

The present disclosure relates to a display device, and more particularly, to a display device that generates sound by vibrating a display panel.

Description of the Related Art

With the development of various portable electronic devices, such as a mobile communication terminal and a notebook computer, a requirement for a display device applicable thereto is increasing.

The display devices include a liquid crystal display device, an electroluminescence display device, a light emitting diode display device, and an organic light emitting diode display device.

Among these display devices, the liquid crystal display (LCD) device typically includes an array substrate including an array of thin film transistors, an upper substrate including a color filter layer and/or a black matrix, etc., and a liquid crystal material layer formed therebetween, wherein an alignment state of the liquid crystal is controlled according to an electric field applied between two electrodes of a pixel area, and thus, the transmittance of light is adjusted to display images. In addition, an organic light emitting diode (OLED) display device has advantages of a high response speed, high light emitting efficiency, high brightness, and wide viewing angle by using self-light emitting organic light emitting diodes (OLEDs).

Meanwhile, a set apparatus or finished product including such a display device as described above may include, for example, a television (TV), a computer monitor, or an advertising panel. Such a display device or set apparatus may include a sound output device, such as a speaker, for generating and outputting sound relating to output images.

It is typical that a company that manufactures a display device, such as a liquid crystal display device or an organic light emitting diode display device, manufactures only the display panel or display device excluding sound functionality, while another company manufactures a speaker and assembles the speaker with the manufactured display device, so as to complete a set apparatus capable of outputting images and sound.

FIG. 1 is a plan view of a speaker included in a related art display device. As shown in FIG. 1, a related art display device 1 includes a speaker 2 disposed at a rear part or a lower part of the display panel. In this structure, sound generated by the speaker 2 does not progress directly toward a viewer, who is viewing an image from the front side of the display device 1, but instead progresses toward the rear part or the lower part of the display panel rather than a front part of the display panel on which the images are being displayed.

Further, when sound generated from the speaker 2 progresses toward the rear part or the lower part of the display panel, the sound quality may be degraded due to an interference with sound reflected by walls, floors, or other surfaces at the rear of or below the display panel.

Also, sound generated by a speaker included in the related art display device is not oriented toward a viewer of the display device and may thus undergo diffraction, which degrades the sound localization. Moreover, in configuring a set apparatus, such as a TV, a speaker may occupy an undesirably large amount of space, which imposes a restriction on the design and spatial arrangement of the set apparatus.

Therefore, there has been an increasing requirement for technology which can improve the quality of sound output from a display device and prevent the viewer's immersion from being disturbed.

SUMMARY

Accordingly, embodiments of the present disclosure are directed to a panel vibration type sound generating display device that substantially obviates one or more of the problems due to limitations and disadvantages of the related art.

An aspect of the present disclosure is to provide a panel vibration type display device that is capable of generating sound by directly vibrating a display panel of a display device.

Another aspect of the present disclosure is to provide a panel vibration type display device that outputs sound in the low sound range from a central area of the display panel and sound in the mid-to-high sound range from left and right areas of the display panel.

Another aspect of the present disclosure is to provide a panel vibration type display device that achieves improved low sound and stereo sound outputs.

Another aspect of the present disclosure is to provide a display device that is capable of reducing deterioration of sound quality characteristic by reflected waves or standing waves.

Another aspect of the present disclosure is to provide a display device that has excellent low sound reproduction as well as left and right stereo sound implementation characteristics.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts as embodied and broadly described, a display device comprises includes a display panel having first, second, and third areas; at least three sound generating actuators including first, second, and third actuators each spaced apart from the other two in a long axis direction of the display panel, wherein the first, second, and third actuators each contact the display panel at the first, second, and third areas, respectively, to generate sound by vibrating the display panel; and a support structure at a rear side of the display panel configured to support the at least three sound generating actuators.

In another aspect, an apparatus, comprises a display panel configured to display images; and a plurality of actuators operatively connected with the display panel and configured to provide vibrations to the display panel to emit sound from the display panel propagating out along a viewing direction of the display panel.

In another aspect, display device, comprises a display panel having at least first and second areas; at least two sound generating actuators including first and second actuators spaced apart from each other in a long axis direction of the display panel, wherein the first and second actuators each contact the display panel at the first and second areas, respectively, to generate sound by vibrating the display panel; a support structure at a rear side of the display panel configured to support the at least two sound generating actuators; and a first partition configured to separate the first and second areas.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated and constitute a part of this application, illustrate embodiments of the disclosure and together with the description serve to explain various principles. In the drawings:

FIGS. 2A and 2B illustrate a display device including a panel vibration type sound generating device according to an embodiment of the present disclosure, in which FIG. 2A is a plan view and FIG. 2B is a cross-sectional view taken along line I-I' of FIG. 2A;

FIG. 14B illustrates an example in which the partition portion has a multi-wall structure.

DETAILED DESCRIPTION

Figure 1:
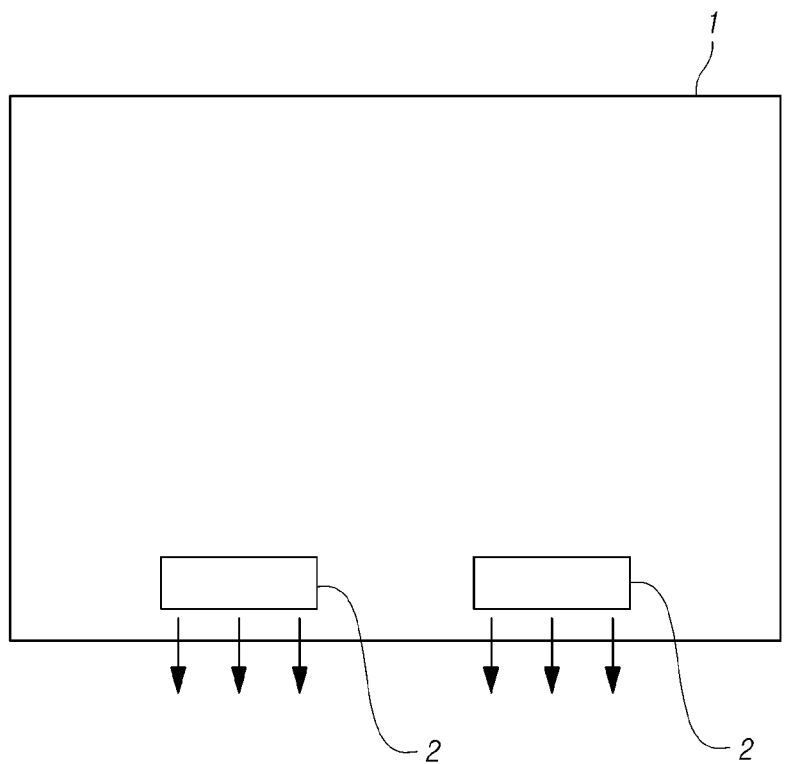
FIG. 1 is a plan view of a speaker included in a related art display device.

Hereinafter, some embodiments of the present disclosure will be described in detail with reference to the accompanying illustrative drawings. In designating elements of the drawings by reference numerals, the same elements will be designated by the same reference numerals although they are shown in different drawings. Further, in the following description of the present disclosure, a detailed explanation of certain functions and configurations incorporated herein may have been omitted merely for the sake of brevity.

In addition, terms, such as first, second, A, B, (a), (b) or the like may be used herein when describing components of the present disclosure. Each of these terminologies is not used to define an essence, order or sequence of a corresponding component but used merely to distinguish the corresponding component from other component(s). In the case that it is described that a certain structural element "is connected to," "is coupled to," or "is in contact with" another structural element, it should be interpreted that another structural element may "be connected to," "be coupled to," or "be in contact with" the structural elements as well as that the certain structural element is directly connected to or is in direct contact with another structural element.

The term "display device" used herein is used as a concept covering not only a display panel in the narrow sense, such as a liquid crystal module (LCM) or an organic light emitting diode (OLED) module that includes a display panel and a driving unit for driving the display panel, but also a set electronic device or a set device, such as a notebook computer, a TV, a computer monitor, equipment display (e.g., display equipment in an automotive display or other type of vehicle display) or a mobile electronic device (e.g., a smart phone or an electronic pad, etc.) that is a complete product or a final product including the LCM, the OLED module, or the like.

That is, the term "display device" used herein is used in the sense of including not only a display device itself, such as an LCM or an OLED module in the narrow sense, but also includes a so-called "set device" which is an application product or final consumer device having a display device implemented therein.

However, in some cases, an LCM or an OLED module, which is constituted with a display panel, a drive unit of the display panel, and the like, may be referred to as a "display device" in the narrow sense, and an electronic device as a complete product including such an LCM or OLED module may be referred to as a "set device" or a "set apparatus" to be distinguished from the display device. For example, the display device in the narrow sense may include a liquid crystal display (LCD) panel or OLED display panel and a source PCB that is a control unit for driving the display panel, and the term "set device" or "set apparatus" may have a concept further including a set PCB that is a set control unit electrically connected to the source PCB so as to control the entire set device or the entire set apparatus.

The display panel used in the present embodiment may be any type of display panel, such as an LCD panel, an OLED display panel, etc. without being limited to a specific display panel technology as long as the display panel is capable of generating sound waves or audible outputs due to vibrations created by the sound generating actuator 200.

For example, if the display panel is an LCD panel, the display panel may include an array substrate including a plurality of gate lines, a plurality of data lines, a plurality of pixels at or near the intersection areas of the gate lines and the data lines, and thin film transistors acting as switching elements configured to adjust light transmittance at each pixel, an upper substrate including a color filter layer and/or a black matrix or the like, and a liquid crystal material layer formed between the array substrate and the upper substrate.

Also, if the display panel is an OLED display panel, the display panel may include an array substrate including a plurality of gate lines, a plurality of data lines, a plurality of pixels at or near intersection areas of the gate lines and the data lines, and thin film transistors configured to selectively apply voltage or current to each of the pixels, an OLED layer on the array substrate, and a sealed substrate or an encapsulation substrate disposed on the array substrate to cover the OLED layer. The sealed substrate protects the thin film transistors, the OLED layer, and the like from external impact, and prevents moisture/oxygen from penetrating into the OLED layer. The layer on the array substrate may include an inorganic light emitting layer(s), for example, quantum dot layer(s), nano-sized material layer(s), etc. that may enhance output image quality.

With any display type, the display panel may further include a backing, such as a metal plate attached thereto. Other structures may also be included.

The display panel having the actuators in the specification may be implemented at a user interface module in a vehicle, such as at the central control panel area in an automobile. For example, such a display panel can be configured between two front seat occupants such that sounds due to vibrations of the display panel propagate towards the interior of the vehicle. As such, the audio experience within a vehicle can be improved when compared to having speakers only at the interior sides in the vehicle.

The display panel used in the display device according to the described embodiments is not limited in its shape, size, type, etc. An LCD panel includes a number of laminated layers and includes a separate light source, namely a backlight.

On the other hand, an organic light emitting diode of the OLED display panel corresponds to a self-light emitting device and thus does not require a separate light source, and various layers, such as a polarization layer (POL), a glass layer, and an encapsulation layer, are laminated as a single panel.

Figure 2A:
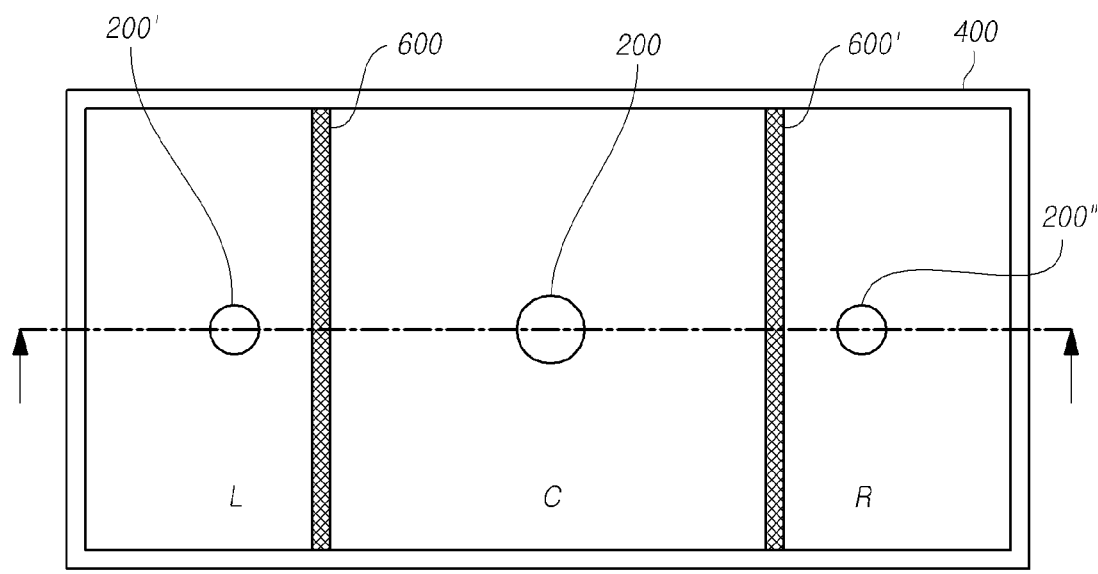
Figure 2B:
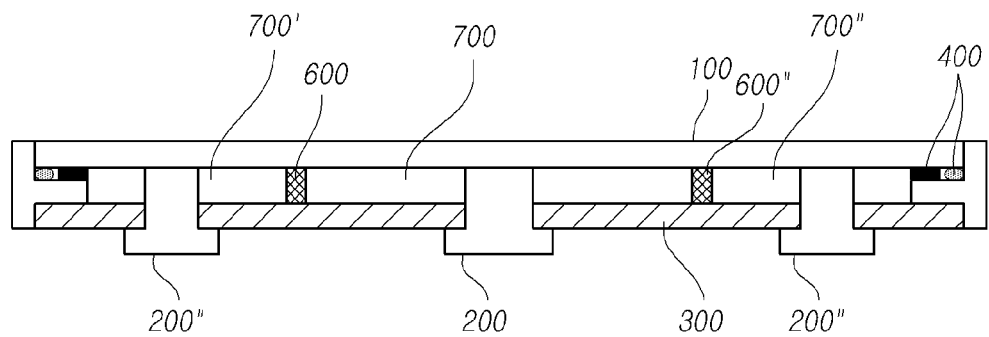

FIGS. 2A and 2B illustrate a display device including a panel vibration type sound generating device according to an embodiment, in which FIG. 2A is a plan view and FIG. 2B is a cross-sectional view taken along line I-I' of FIG. 2A.

As illustrated in FIGS. 2A and 2B, the display device may include a display panel 100 configured to display an image, and sound generating actuators 200, 200', and 200" configured to come in contact with one surface of the display panel 100 and to vibrate the display panel 100, thereby generating sound. The sound generating actuators may include a central actuator 200 for generating relatively low sound, which is disposed in a central area C of the display panel 100, and include a left actuator 200' and a right actuator 200" which are disposed in the left area L and the right area R, which are positioned at the left and right sides of the central area, respectively, to achieve stereo sound outputs. A first partition portion 600 is disposed between the central area and the left area and a second partition portion 600' is disposed between the central area and the right area.

The first and second partition portions 600 and 600' function as members for separating the sounds in the low sound range generated in the central area and the sound in the mid-high sound range generated in the left and right areas. In other words, the first and second partition portions 600 and 600' create multiple closed compartments having particular dimensions that allow the creation of relative low sounds and relatively mid-high sounds. The first and second partition portions 600 and 600' may be disposed symmetrically with respect to each other in position and may have the same structure. Therefore, the first partition portion 600, which separates the central area C and the left area L will be representatively described below. The same configuration may also be applied to the second partition portion 600'.

The first partition portion 600 is a partition structure extending in the vertical direction of the display panel 100 (when considered in a normal viewing orientation) and disposed between the display panel 100 and a cover bottom 300, that is a rear support structure, and is provided to separate the sound in the mid-high sound range generated from the left actuator 200' and the sound in the low sound range generated from the central actuator 200 from each other to prevent or reduce the sound characteristics from being deteriorated due to the interference of both sounds.

The first partition portion 600 may be formed of a foam pad, a one-sided or double-sided tape, or from some other appropriate material, and may be bonded to at least the upper surface of the cover bottom and may be in contact with the lower surface of the display panel 100 in a bonded or non-adhesive manner. To improve the low sound emission characteristics together with the sound separation function for the sounds of the low sound range and the sounds of the mid-high sound range, the first partition portion 600 may be in contact with the lower surface of the display panel 100 in a non-adhesive manner, and the height H1 of the first partition portion 600 may be equal to or larger than the gap between the display panel 100 and the cover bottom 300, e.g., the width of the first to third spaces or air gap spaces 700, 700', and 700".

The detailed configuration of the first partition portion 600 will be described in detail below with reference to FIGS. 13A to 13C.

Meanwhile, the upper and lower sides of the central area C in which the central actuator 200 is disposed is defined by a baffle part 400, the left and right sides of the central area c is defined as first and second partition portions 600 and 600'. The central area C may be sealed as the first space 700, which is defined by the baffle part 400, partition portions 600 and 600', and one surface of the front and rear sides of the display panel 100 and the upper surface of the cover bottom 300 as a rear support structure of the display device.

Also, in the left area L in which the left actuator 200' is disposed, the right side is defined by a first partition portion 600 and the remaining three sides refer to an area that is defined as a baffle part 400. The space in the left area L between the display panel 100 and the cover bottom 300 may be called a second space 700'.

As described below with reference to FIGS. 4A and 4B and the like, each of the central actuator 200 and the left and right sound generating actuators 200' and 200'' may include a magnet 220, a plate 210 for supporting the magnet 220, a center pole 230 protruding from a central area of the plate 210, and a bobbin 250 disposed to surround the periphery of the center pole 230 and wound with a coil 260 to which a current for generating sound is applied. A tip end of the bobbin 250 is disposed to come in contact with one surface of the display panel 100. However, such detailed structure is merely exemplary, as various other equivalent components can be used to implement the actuators used for the embodiments of the present disclosure.

The display device may further include a cover bottom 300 as a rear support structure, which is coupled to the middle cabinet or the like, to handle the supporting the rear side of the display panel 100 and to fix the actuators according to example embodiments. For example, the sound generation actuator may be fixed inserted into a support hole formed through a cover bottom that is a rear support structure for a display device.

In this case, the cover bottom 300 used herein may also be referred to by other terms (e.g., a plate bottom, a back cover, a base frame, a metal frame, a metal chassis, a chassis base, and an m-chassis). The term "cover bottom" shall be understood as a concept including any type of a frame or a plate-shaped structure disposed on the rear base of the display device for supporting the display panel 100. However, the support structure may include additional parts, may include multiple parts, and need not cover an entire rear of the display device. Further, the sound generation actuator may be directly or indirectly secured to the support structure.

As illustrated in FIG. 2B, the display device may include a rear support structure that supports at least one of the rear surface and side surface of the display panel 100, and the plate of each actuator is fixed to the support structure thereof. The rear support structure may include the cover bottom 300 disposed on the rear surface of the display panel 100, and may further include a middle cabinet coupled to the cover bottom while enclosing the side surface of the display panel 100 and accommodating and supporting one side edge of the display panel 100. The cover bottom constituting the rear support structure may be a plate-shaped member formed of a metal or plastic that extends over the entire rear surface of the display device.

Meanwhile, in the sound generating display device, the central actuator 200 directly vibrates the display panel 100 in the central area to generate sound in the low sound range, and the left and right actuators 200' and 200'' directly vibrate the display panel portions of the left area L and the right area R to generate sound in the mid-high sound range.

That is, a so-called 2.1 channel type sound output characteristic may be provided such that the central actuator is capable of outputting low sound (low frequency sound) and the left and right areas are capable of outputting stereo sound. Herein, the low frequency range is defined as 300 Hz or less, the middle frequency range is defined as 300 HZ to 1.5 kHz, and the high frequency range is defined as 1.5 kHz or more.

Meanwhile, the embodiments herein may adopt at least one of a first operation mode in which the threshold frequency of the low sound $f_0$ of the central actuator 200 is adjusted to be lower than the threshold frequency of the low sound of the left and right actuators 200' and 200'' and a second operation mode in which the area of the central area C is formed to be larger than the area of the left area L and the area of the right area R. Here, the threshold frequency of the low sound $f_0$ is a lower limit value of a reproduction frequency band of each actuator, and means the frequency of the lowest waves of the low sound range, which can be generated by each actuator, and may be expressed by a lowest resonance frequency.

With this configuration, the sound in the low sound range becomes larger than the sound in the mid-high sound range, so that the low sound characteristic can be improved. In particular, when the area of the central area C is made larger than the area of the left and right areas, the area of the vibration plate of the low sound becomes larger even with the same actuator, and as a result, thereby stably outputting low sound.

As described below with reference to FIGS. 10A to 11B, the interference between the reflected waves that are reflected by partition portions and the traveling waves may generate so-called "standing waves" that result in deteriorated sound quality. To address such issues, in another embodiment, the partition portions are not formed in simple straight line (or linear) shapes, but may further include non-straight (or non-linear) segments, such as having a bent portion that is bent toward an actuator.

As described with reference to FIGS. 12A and 12B, the display device may further include a metal plate (or plate-like element made of other materials) disposed in the central area to improve a low sound characteristic and to emit or dissipate heat generated from the actuator. The metal plate may be a heat-conductive plate-shaped member having a particular mass. The metal plate may be attached to a part of the display panel 100 in the central area, and may be disposed such that the central actuator 200 is placed at the center thereof.

As described with reference to FIGS. 14A and 14B, the first and second partition portions may be formed in a double-wall structure, which may more reliably ensure the separation of the sound of the low sound range in the central area and the sound of the mid-high sound range in the left and right areas.

Hereinafter, some other components of the display device according to embodiments will be described in more detail.

The display device may include a first space 700 in the central area C, a second space 700' in the left area L, and a third space 700'' in the right area R, which are spaces created between the cover bottom 300 that is a rear support structure or the middle cabinet and the display panel 100 to transmit generated sound waves. The display device may further include a baffle part 400 to form first to third spaces together with the first and second partition portions 600 and 600'.

That is, as illustrated in FIG. 2B, the baffle part 400 is formed as a four-sided sealing structure between the display panel 100 and the cover bottom 300. By the baffle part 400 and the first and second partition portions 600 and 600', a first space 700 is formed around the central actuator 200, a second space 700' is formed around the left sound generating actuator 200', and a third space 700'' around the right sound generating actuator 200". The first to third spaces 700, 700', and 700" function as a closed space in which sound is generated when the display panel is vibrated by the central actuator 200 and the left and right sound generating actuators 200' and 200". In this case, the central actuator 200, the left actuator 200', and the right actuator 200" can be disposed at horizontally and/or vertically symmetrical positions in the first space 700, the second space 700', and the third space 700", respectively, thereby having stable low sound and stereo sound characteristics as well as ensuring the durability and reliability of the sound generating display device.

The first and second partition portions 600 and 600' may extend in the vertical direction of the display panel 100 to separate the sound of the low sound range generated in the central area C and the sound of the mid-high sound range generated in the left and right areas L and R.

That is, each of the first and second partition portions functions to block the sound of one of adjacent two spaces from being transmitted to the other space by attenuating or absorbing the vibration of the display panel in the spaces in the central area therebetween.

The first and second partition portions 600 and 600' may be constituted with a double-sided tape or a single-sided tape formed of polyurethane (PU) or polyolefin (PO) having a particular height (thickness) and width, and may have elasticity to be compressible to a certain extent. The first and second partition portions 600 and 600' may be expressed by other terms or expressions, such as a foam pad.

The first and second partition portions 600 and 600' are disposed between the upper surface of the cover bottom 300 and the lower surface of the display panel 100, and are fixedly bonded to at least the upper surface of the cover bottom. The upper end surfaces of the first and second partition portions 600 and 600' may be in contact with the lower surface of the display panel 100, but may be fixedly bonded to the lower surface of the display panel 100 or may be in contact with the lower surface of the display panel without being bonded thereto. The detailed configurations of the first and second partition portions 600 and 600' will be described with reference to FIGS. 13A to 13C.

Also, as further described below, each of the actuators 200, 200', 200" may be configured with at least two or more sub-actuators, and the sub-actuators may be spaced apart from each other by a particular distance in the horizontal and vertical directions. The horizontal direction may refer to a long side (or row) direction of the display device, and the vertical direction may refer to a short side (or column) direction of the display device.

The baffle part 400 may include an adhesive portion disposed at an edge of the cover bottom or the middle cabinet to be bonded to the lower surface of the display panel and a sealing portion disposed outside the adhesive portion to further provide a sealing property of the first to third spaces 700, 700', and 700". In this case, the adhesive portion may be a double-sided tape. As described below with reference to FIGS. 7A to 7C, the height of the sealing portion may be larger than the height of the adhesive portion.

The detailed structure of such a baffle part will be described with reference to FIGS. 7A to 7B.

Figure 3A:
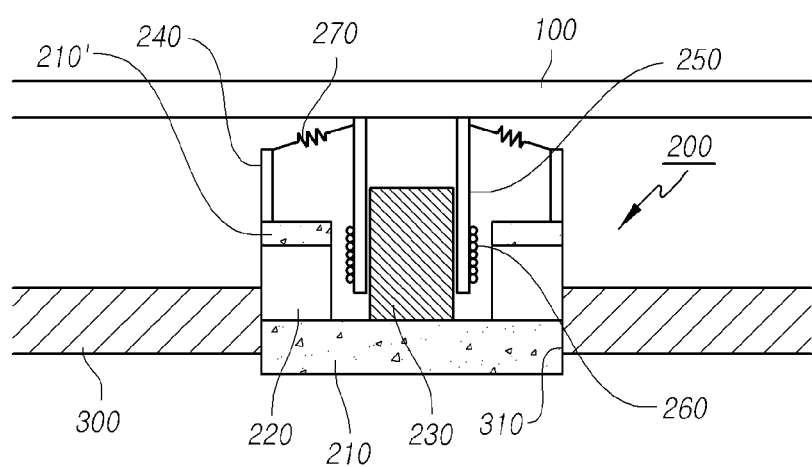
FIGS. 3A and 3B are cross-sectional views of two types of sound generating actuators, each of which may be used as a central actuator or a left or right actuator according to the present disclosure.
Figure 3B:
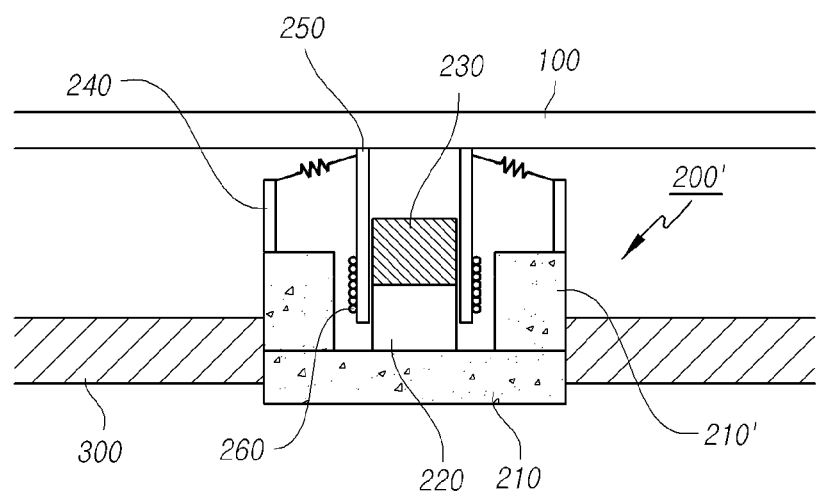

FIGS. 3A and 3B are cross-sectional views of two types of sound generating actuators, each of which may be used as the central, left, and right actuators 200, 200', and 200" according to the present disclosure.

The central and left and right actuators 200, 200', 200" may have the same shape. The central actuator will be representatively described below for the convenience, but may also be applied to the left and right actuators.

The central actuator 200 may include a magnet 220 as a permanent magnet, plate 210 and 210' configured to support the magnet 220, a center pole 230 protruding from a central area of the plates, a bobbin 250 arranged to surround the center pole 230, and a coil 260 wound around the outer periphery of the bobbin 250 and applied with a current for generating sound.

Meanwhile, a sound generating actuator may include both of a first structure in which the magnet is disposed outside the coil and a second structure in which the magnet is disposed inside the coil.

FIG. 3A illustrates the first structure in which the magnet is disposed outside the coil, in which the first structure may be referred to as a dynamic type or an external magnet type.

In a sound generating actuator according to the first structure, the lower plate 210 is fixed to a support hole 310 formed in the cover bottom 300, and the magnet 220, which is an annular permanent magnet, is disposed around the outer portion of the lower plate 210.

An upper plate 210' is disposed above the magnet 220, and an outer frame 240 formed to protrude from the upper plate 210' is disposed on the outer periphery of the upper plate 210'.

The center pole 230 protrudes from the central area of the lower plate 210 and the bobbin 250 is disposed to surround the center pole 230. The coil 260 is wound around the lower portion of the bobbin 250, and a current for generating sound is applied to the coil 260. Meanwhile, a damper 270 may be disposed between a part of the upper portion of the bobbin 250 and the outer frame 240.

The lower plate 210 and the upper plate 210' are configured to fix the sound generating actuator 200 to the cover bottom 300 while supporting the magnet 220. As illustrated in FIG. 3A, the lower plate 210 is provided in a circular shape, the ring-shaped magnet 220 is provided on the lower plate 210, and the upper plate 210 is provided on the magnet 220.

With the lower plate 210 and the upper plate 210 are coupled to the cover bottom 300, the magnet 220 positioned between the lower plate 210 and the upper plate 210' may be fixedly supported. The plates 210 and 210' may be formed of a magnetic material, such as iron (Fe). The plate is not limited by the term, but may be expressed by other terms, such as a yoke. Also, the center pole 230 and the lower plate 210 may be integrally formed.

The bobbin 250 is an annular structure formed of paper, an aluminum sheet, or the like, and the coil 260 is wound around a particular lower area of the bobbin 250. The bobbin 250 and the coil 260 may be collectively referred to as a voice coil. When a current is applied to the coil 260, a magnetic field is formed around the coil 260, and because there is an external magnetic field formed by the magnet 220, the entire bobbin 2250 moves upward while being guided by the center pole 230 according to Fleming's Law. Because the tip end portion of the bobbin 250 is in contact with the rear surface of the display panel 100, the display panel 200 is vibrated according to the current application or non-application state, and sounds are generated due to the vibrations.

For the magnet 220, a sintered magnet, containing materials such as barium ferrite or the like, may be used, and as the material thereof, an alloy casting magnet of ferric oxide ($Fe_2O_3$), barium carbonate ($BaCO_3$), strontium ferrite with an improved magnetic component, aluminum (Al), nickel (Ni), and cobalt (Co), or the like may be used, but is not limited thereto.

The damper 270 may be disposed between a portion of the upper side of the bobbin 250 and the outer frame 240, and the damper 270 is provided in a corrugated structure to shrink and relax in accordance with the vertical movements of the bobbin 250 to adjust the vertical vibration of the bobbin 250. That is, because the damper 270 is connected to each of the bobbin 250 and the outer frame 240, the vertical vibration of the bobbin 250 is limited by the restoring force of the damper 270. For example, when the bobbin 250 is vibrated to an upwardly particular height or higher or to a downwardly particular height or lower, the bobbin 250 can be returned to its original position due to the restoring force of the damper 270. Such a damper 270 may be expressed by any other term, such as an edge.

Meanwhile, FIG. 3B illustrates the second structure in which the magnet is disposed inside the coil, in which the second structure may be referred to as a micro type or an internal magnet type.

In a sound generating actuator according to the second structure, the lower plate 210 is fixed to the support hole 310 formed in the cover bottom 300, and the magnet 220 is disposed in the central area of the lower plate 210, and a center pole 230 is formed to extend to the upper side of magnet 220.

An upper plate 210' protrudes from the outer periphery of the lower plate 210, and the outer frame 240 is disposed outside the upper plate 210'. A bobbin 250 is disposed to surround the periphery of the magnet 220 and the center pole 230, and a coil 260 is wound around the outer periphery of the bobbin 250. A damper 270 is disposed between the outer frame 240 and the bobbin 250.

The second type sound generating actuator can reduce magnetic flux leakage and the and can be made compact as compared to the first type sound generating actuator.

In the present embodiment, both of the first type sound generating actuator and the second type sound generating actuator can be used, and for the convenience of description, the first type sound generating actuator will be representatively described below. A sound generating actuator used in the display device according to the present embodiment is not limited to the type illustrated in FIGS. 3A and 3B. A sound generating actuator of any other type may be used as long as the sound generating actuator can vibrate the display panel up and down according to the application of a current to generate sound.

Figure 4A:
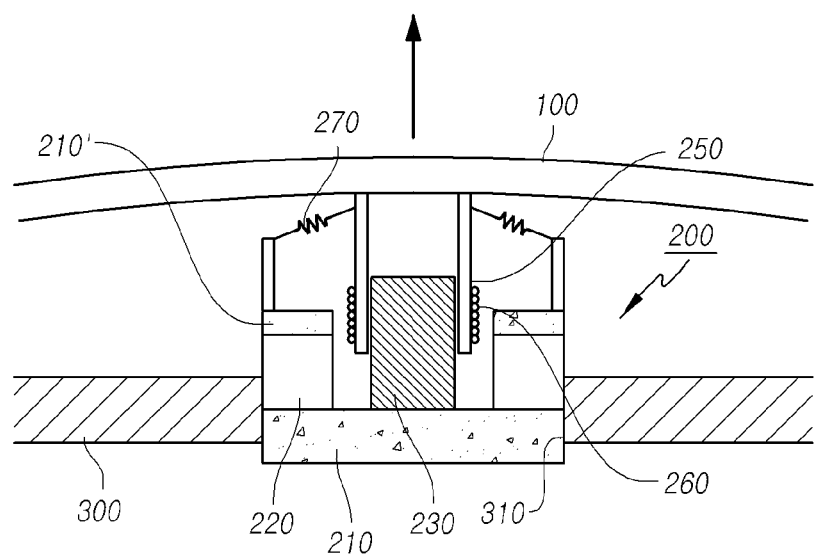
FIGS. 4A and 4B illustrate states in which the central actuator or the left or right actuator according to an embodiment of the present disclosure vibrates the display panel to generate sound.
Figure 4B:
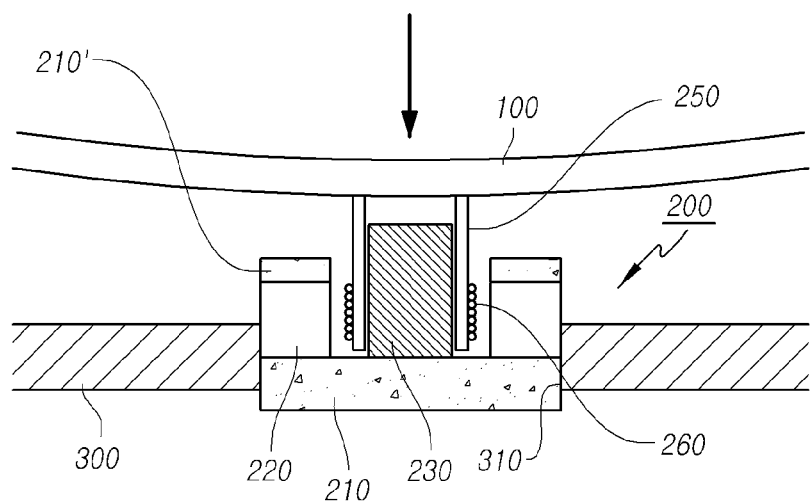

FIGS. 4A and 4B illustrate states in which a sound generating actuator according to an embodiment of the present disclosure vibrates a display panel to generate sound.

With reference to FIG. 4A, in a state in which a current is applied, the center pole 230 connected to the lower surface of the magnet 220 becomes an N pole and the upper plate 210' connected to the upper surface of the magnet 220 becomes the S pole so that an external magnetic field is formed between the coils 260. In this state, when a current for generating sound is applied to the coil 260, an applied magnetic field is generated around the coil 260, and a force for moving the bobbin 250 upward is generated due to the applied magnetic field and the external magnetic field.

Accordingly, as illustrated in FIG. 4A, the bobbin 250 moves upward and the display panel 100, which is in contact with the tip end of the bobbin 250, vibrates upward (arrow direction). In this state, when the application of the current is stopped or a current in the opposite direction is applied, a force for moving the bobbin 250 downward is generated according to a similar principle as illustrated in FIG. 4B, and as a result, the display panel 100 vibrates downward (arrow direction). In this manner, the display panel vibrates upward and downward according to the current application direction to the coil and the magnitude of the current, and a sound wave is generated by the vibration.

Figure 5A:
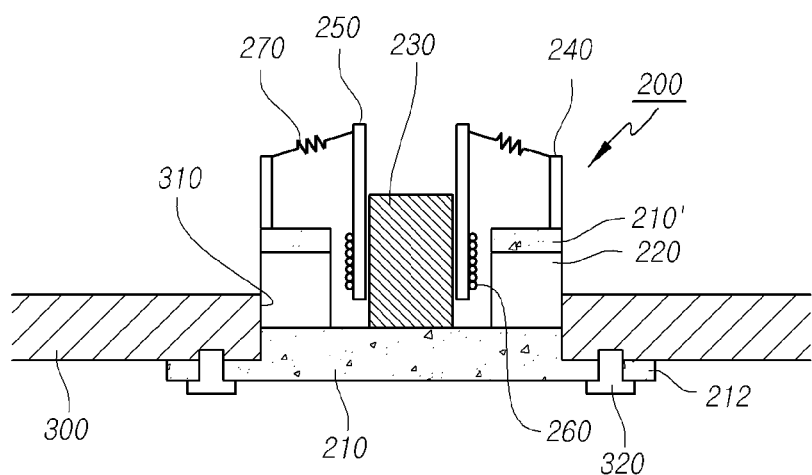
FIGS. 5A and 5B illustrate an example of a coupled state between the central actuator or the left or right sound actuator according to an example embodiment of the present disclosure and a cover bottom that is a rear support structure of the display device.
Figure 5B:
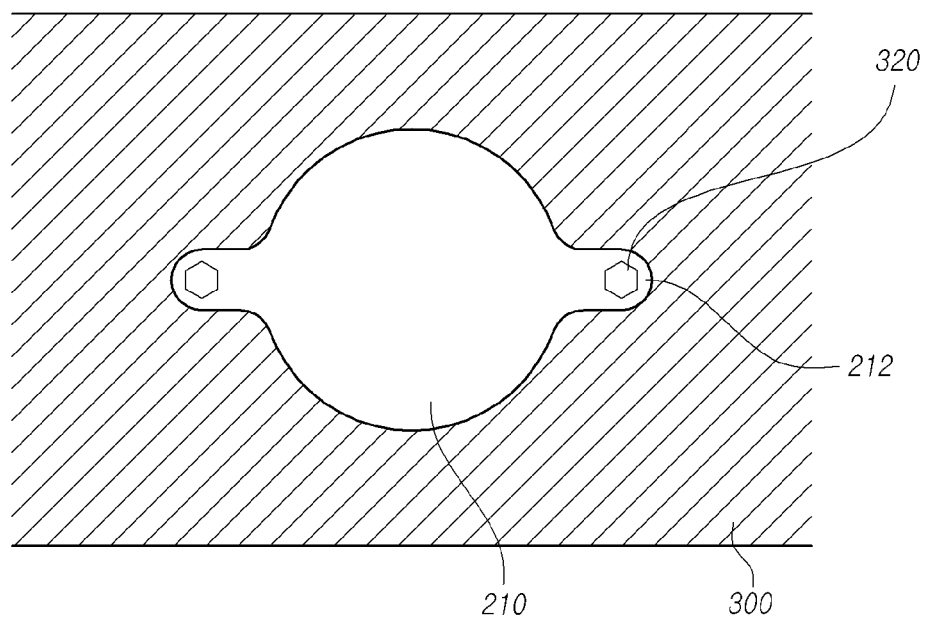
Figure 6A:
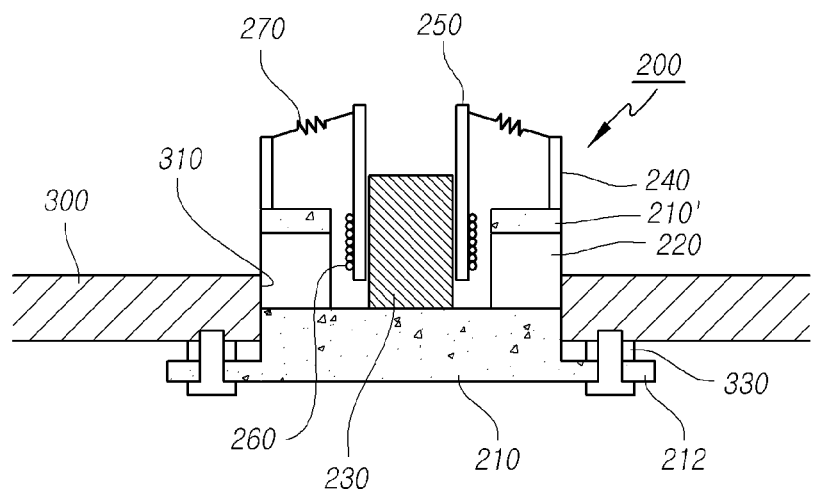
FIGS. 6A and 6B illustrate other embodiments for the coupling structure between the central actuator or the left or right actuator and the cover bottom.
Figure 6B:
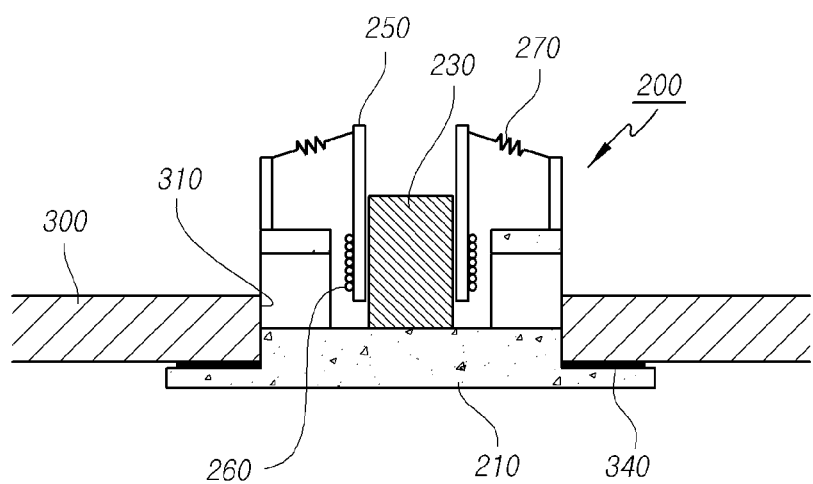

FIGS. 5A and 5B illustrate an example of a coupled state between a sound generating actuator according to an embodiment of the present disclosure and a cover bottom which is a rear support structure of a display device. FIGS. 6A and 6B illustrate other embodiments for the coupling structure between a sound generating actuator and a cover bottom.

Hereinafter, one of the central actuator 200, the left actuator 200', and the right actuator 200" having the same structure or similar will be representatively described as a sound generating actuator. The same or similar description can be applied to the other sound generating actuator.

The sound generating actuator 200 according to the present embodiment can be supported through a support hole formed in the cover bottom or the back cover, which is a support structure of the display device, and FIGS. 5A and 5B and FIGS. 6A and 6B illustrate various support structures.

In the support structure of FIGS. 5A and 5B, a support hole 310 is formed through the cover bottom 300, and at least one of the lower plate 210, the magnet 220, and the upper plate 210' of the sound generating actuator 200 is inserted into and accommodated in the support hole 310. Extension portions 212 are further formed on the low surface of the lower plate 210 to extend to the outside of the lower plate 210. The extension portions 212 are fixed to the low surface of the cover bottom 300 to mount the sound generating actuator 200 on the cover bottom 300.

As described above, when the sound generating actuator 200 is fixed to be inserted into the support hole 310 formed in the cover bottom 300, the distance between the display panel 100 and the cover bottom 300 can be reduced, so that the thickness of the display device can be reduced. That is, between the display panel and the cover bottom, a first space and a second space, which are the spaces through which the display panel can be vibrated, may be present. If the sound generating actuator is configured to be inserted into and fixed to the support hole of the cover bottom, the space can be reduced because the height of the sound generating actuator disposed between the rear surface of the display panel and the inner surface of the cover bottom can be reduced.

FIGS. 5A and 5B illustrate a type in which screw holes are formed in the rear surface of the cover bottom 300 and bolts 320 or screws are fastened through the through holes formed in the extension portions 212 of the lower plate 210 thereby fixing the sound generating actuator 200 to the cover bottom 300.

Meanwhile, FIG. 6A does not illustrate a simple screw coupling type, but a type in which self-clinching nuts 330 (e.g., PEM® nuts or other self-clinching nuts), which can secure a particular distance between the cover bottom 300 and the extension portions 212 of the lower plate 210, are disposed and fixed with the bolts 320 as shown FIG. 5B. As illustrated in FIG. 6A, when the self-clinching nuts 330 are used, a particular space is secured between the sound generating actuator 200 and the cover bottom 300 to reduce the transmission of the vibration of the actuator 200 to the cover bottom 300.

In FIG. 6B, an adhesive member 340, such as a double-sided tape, is disposed between the extension portions 212 of the lower plate 210 of the actuator 200 and the cover bottom 300, thereby fixedly bonding the actuator 200 and the cover bottom 300 to each other. When the adhesive member 340 is used as illustrated in FIG. 6B, the adhesive member 340 may act as a kind of a damper when the elasticity and the thickness of the adhesive member 340 are appropriately adjusted so that the transmission of the vibration of the actuator 200 to the cover bottom 300 can be reduced.

As illustrated in FIGS. 5A and 6B, by adopting a method of fixedly inserting the sound generating actuator 200, which comes in contact with the display panel 100 to directly vibrate the display panel 100, into the support hole formed in the cover bottom, the thickness of the display device can be reduced as compared to a case where the actuator is completely accommodated in the inside of the display device.

Figure 7A:
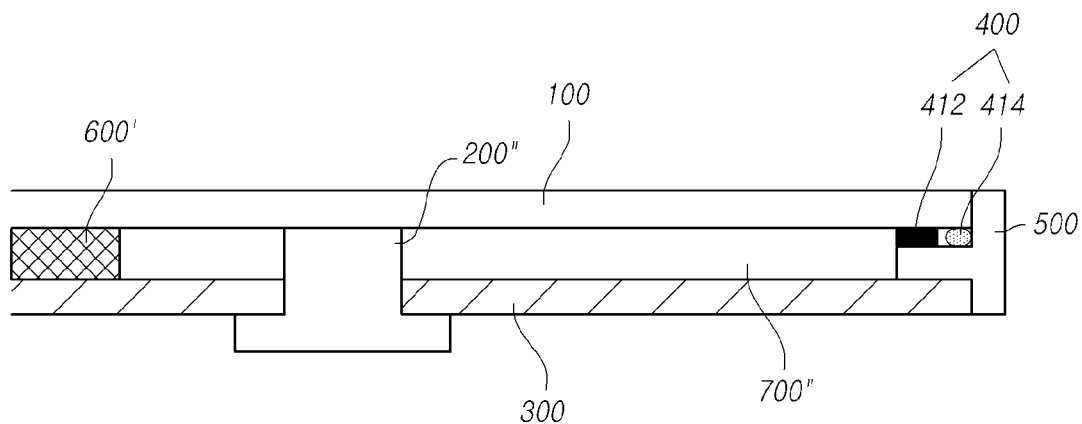
FIGS. 7A to 7C illustrate an example of a baffle part formed between the display panel and the support structure of the display panel to form air gap spaces AG_L, AG_C, and AG_R for sound transmission between the display panel as a vibration plate and the cover bottom.
Figure 7B:
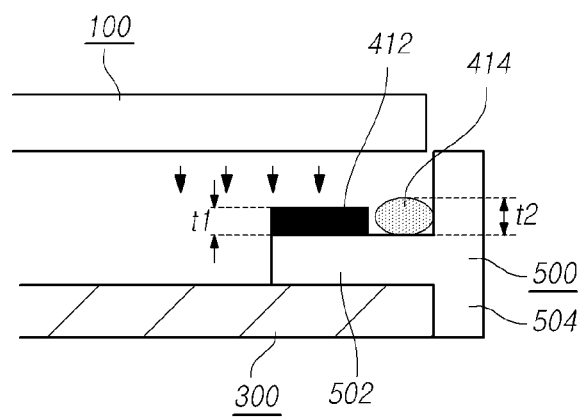
Figure 7C:
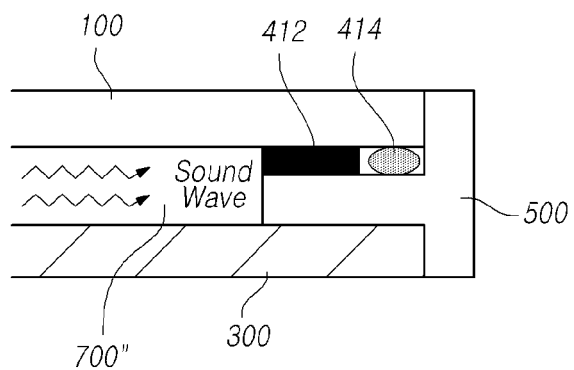

FIGS. 7A to 7C illustrate an example of a baffle part that is disposed between the display panel as a vibration plate and the cover bottom to define an edge of the entire space.

Of course, the baffle part to be described below may alternatively not be formed between the middle cabinet and the display panel. When the baffle part is formed inside the outer periphery of the display device, as illustrated in FIG. 14A, the baffle part may be disposed between the display panel and the cover bottom.

As illustrated in FIG. 7A, in the panel vibration type sound generating device according to the present embodiment, it may be necessary to secure a third space 700" to allow the display panel 100 to be vibrated therein by the right sound generating actuator 200" between the display panel 100 and the support structure (e.g., the cover bottom 300). That is, one side of the display panel may be bonded to the support structure of the display panel so that a sound wave can be generated when the display panel is vibrated, and in particular, the generated sound may not leak to the outside through a side surface or the like of the display device. Thus, for this purpose, the display device according to the present embodiment forms a constant baffle part 400 between the lower surface of the display panel and the support structure.

A particular area (e.g., a space) may be defined around the sound generating actuator, and at the edge of the area, the baffle part 400 is disposed between the lower surface of the display panel 100 and the upper surface of the middle cabinet 500 or the cover bottom 300. In this case, the baffle part 400 includes an adhesive portion 412, such as a double-sided tape bonded between the low surface of the display panel and the upper surface of the support structure of the display device, and a sealing portion 414 is further disposed on the outer periphery of the adhesive portion. The area in which the baffle part 400 is formed may be the entire display panel area defined by the four peripheral edges of the display panel, but it is not limited thereto. As illustrated in FIG. 14A and the like, the area may be defined as an area having four sides inside the outer periphery of the display panel.

As illustrated in FIGS. 7A to 7C, the support structure of the display device may further include a middle cabinet 500 coupled to the cover bottom 300 and configured to seat a part of the display panel therein, in addition to the cover bottom 300 that covers the entire rear surface of the display panel 100.

As shown in FIG. 7B, the middle cabinet 500 is a frame-shaped member formed along the periphery of the display panel, and includes a horizontal support portion 502 on which a part of the display panel is seated, and a vertical support portion 504 that is formed by being bent to the both sides from the horizontal support structure to cover the side surface of the cover bottom 300 and the side surface of the display panel 100, so that the middle cabinet 500 may generally have a T-shaped cross section.

The middle cabinet 500 constitutes the side external part of the display device or the set device. In some cases, the middle cabinet 500 may not be used or may be integrally formed with the cover bottom 300.

In FIGS. 7A to 7C, the adhesive portion 412 constituting the baffle part 400 is a double-sided tape disposed between the upper surface of the horizontal support portion of the middle cabinet 500 and the display panel 100, and serves to fixedly bond the lower surface of the display panel 100 to the middle cabinet 500.

A sealing portion 414 constituting the baffle part 400 may be further disposed on the outer periphery of the adhesive portion 412 and has a thickness or height greater than the thickness or height of the adhesive portion 412. The sealing portion 414 may be formed of a material, such as rubber having high elasticity, and has a thickness t2 that is larger than the thickness t1 of the adhesive portion 412, as illustrated in FIG. 7B.

That is, as illustrated in FIG. 7B, one side of the adhesive portion 412, which is a double-sided tape having a thickness t1, is bonded to be disposed on the inner portion of the upper surface of the horizontal support portion 502 of the middle cabinet 500, and a sealing portion 414 formed of an elastic material and having a thickness larger than t1 is disposed outside the periphery of the adhesive portion. In this state, when the display panel 100 is attached to the other bonding surface of the adhesive portion 412, the sealing portion 414 having the larger thickness is pressed to a certain degree, so that the display panel 100 and the middle cabinet 500 are bonded to each other (FIG. 7C).

Accordingly, the sealing property of the third space 700" around the right sound generating actuator 200" can be further improved.

By coupling the display panel 100 and the cover bottom 300 with each other while forming the third space 700' by the thickness of the horizontal support portion 502 of the middle cabinet 500 and the adhesive portion 412, as illustrated in FIG. 7C, it is possible to secure a vibration space in which the display panel 100 can generate sound and to prevent the sound waves generated in the vibration space from flowing out to the outside along the side surface of the display device 100. Particularly, by forming the baffle part 400 disposed at the edge of the space in a double wall structure of the adhesive portion 412 and the sealing portion 414, and forming the sealing portion 414 to have a larger thickness, the sealing property of the space can be further improved so that the leakage of sound can be further blocked.

It may be understood that the middle cabinet 500 herein may be expressed by other terms, such as a guide panel, a plastic chassis, a p-chassis, a support main, a main support, and a mold frame, and may include all the types of members including a square frame-like structure that has a sectional shape having a plurality of bent portions and is connected to the cover bottom to be used to support the display panel and the baffle part.

Meanwhile, although the middle cabinet may be used to support a gap between the cover bottom and the display panel, the middle cabinet may not be a necessary structure. That is, when the display device has a support structure of only a cover bottom or a back cover without a middle cabinet, or when the first or second space is defined in an inner partial area of the display device as illustrated in FIG. 14A, the baffle part described above with reference to FIGS.

7A to 7C may be disposed between the upper surface of the cover bottom and the low surface of the display panel.

In this case, the adhesive portion 412 in the form of a double-sided tape is disposed on a part of the upper surface of the cover bottom, and the sealing portion 414 having a thickness larger than the thickness of the adhesive portion 412 may be disposed outside the adhesive portion 412. In this state, when the display panel 100 is coupled with the cover bottom 300, the sealing portion 414 is squeezed such that the sealing property of the space 700" for sound transmission can be ensured.

Here, the thickness of the space, that is, the distance between the display panel and the cover bottom in the space may be set to about 0.8 to 2.5 mm, but may be set to a different range according to the vibration degree of the display panel without being limited thereto.

Figure 8A:
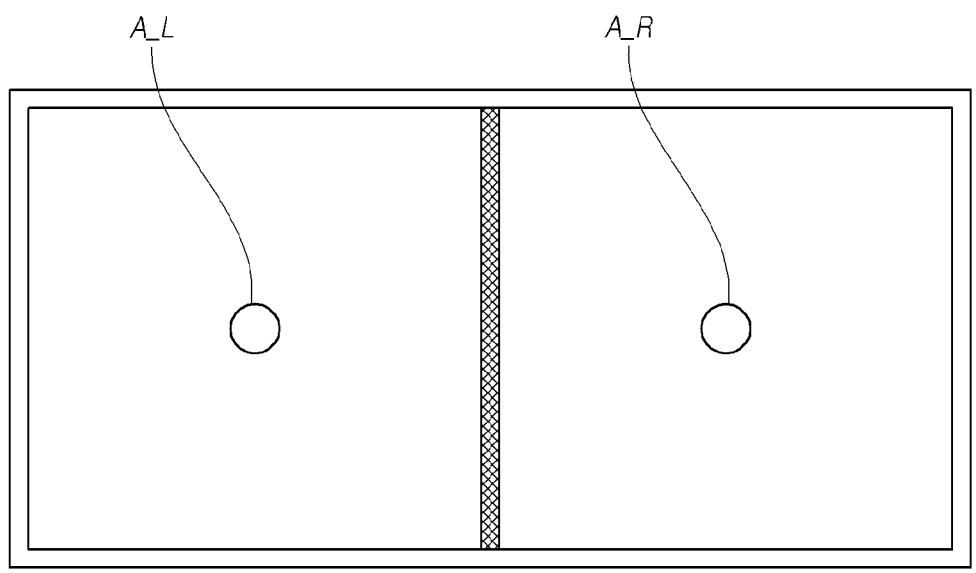
FIG. 8A is a plan view of a two-channel sound implementation display device including only the left and right actuators.
Figure 8B:
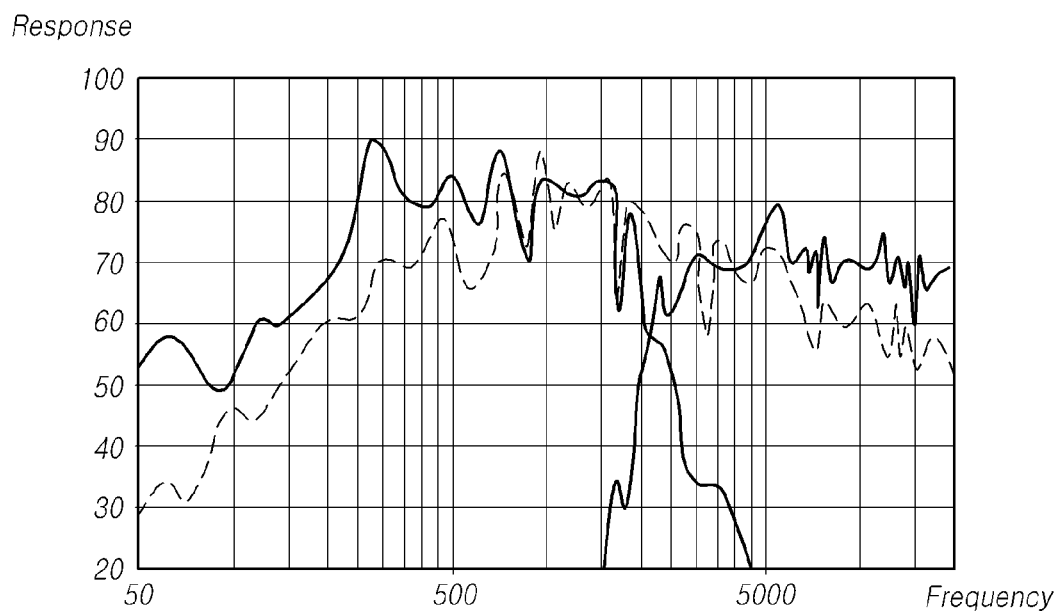
FIG. 8B is a graph illustrating sound generating characteristics of the display device of FIG. 8A and the display device according to an example embodiment.

FIG. 8A is a plan view of a two-channel sound implementation display device including only the left and right actuators, and FIG. 8B is a graph illustrating sound generating characteristics of the display device of FIG. 8A and the display device according to an example embodiment.

FIGS. 8A and 8B illustrate a display device compared with the display device according to an example embodiment, and sound generating characteristics of the display device of FIG. 8A and the display device according to an example embodiment in comparison, respectively.

FIG. 8A illustrates an example in which only the left and right areas are separated without a central area, a left actuator and a right partition are disposed in the left area and the right area, respectively, and one partition portion is disposed to separate the left area and the right area from each other. That is, the display device of FIG. 8A is a 2-channel type display device that provides only left and right stereo sound without a central low frequency range.

The dotted line in FIG. 8B represents the sound pressure characteristics for respective sound ranges of the 2-channel type display device of FIG. 8A. It can be seen that the sound pressure in the low frequency range is relatively low.

When the display panel as a vibration plate is enlarged to overcome such a low frequency weakening phenomenon, the resonance frequency of the low sound is decreased, but there is an issue in that the frequency band of the mid-high sound range is also lowered. Here, it is possible to consider further arranging a separate speaker configured to output a low sound at a particular position of the display device or the set device. However, in such a case, the sound of the low sound range is output to the rear side or the lower side of the set device, while the sound of the mid-high sound range is generated from the display panel so that the sound generating positions of the respective frequency bands are different from each other, which may deteriorate the feeling of immersion.

On the contrary, the solid line in FIG. 8B represents sound pressure characteristics of a so-called 2.1-channel type display device that according to the embodiment of the present disclosure. Upon comparing with FIG. 8A, it can be confirmed that the sound pressure in the low sound frequency range, in particular in the frequency band of 300 Hz or less, is increased, and the sound pressure in the high sound frequency range of 5 kHz or more is also increased as compared with the embodiment of FIG. 8A.

As described above, by using the 2.1-channel type sound generating display device, it is possible to improve the sound characteristics of the low and high sound ranges as compared with the 2-channel type display device in which only the left and right stereo is implemented, and both the sound in the low sound range and the sound in the mid-high sound range are generated in the same display panel, so that the feeling of immersion can be improved.

Figure 9:
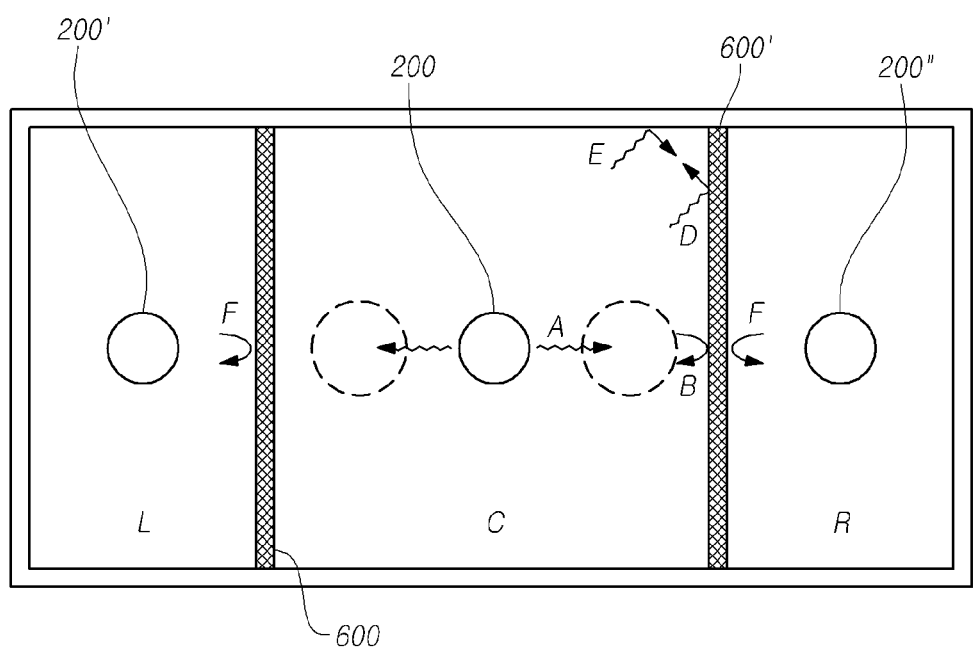
FIG. 9 is a view illustrating standing waves generated by reflected sound waves reflected from a partition portion and the sound characteristic weakening phenomenon in the display device according to embodiments of the present disclosure.

FIG. 9 is a view illustrating standing waves generated by reflected sound waves reflected from a partition portion and the sound characteristic weakening phenomenon in the display device according to embodiments of the present disclosure.

As illustrated in FIG. 9, the sound waves generated due to the vibration of the display panel by the respective actuators propagate radially from the centers of the actuators, and the sound waves are expressed as traveling waves A for convenience. In this case, when the traveling sound waves encounter a partition portion or a baffle part, the traveling sound waves are reflected by partition portion or the baffle part, thereby forming reflected waves that advance in the opposite direction.

The reflected waves overlap and interfere with the traveling waves to form a so-called standing waves, in which superimposed sound waves stagnate at a certain position without advancing, and the sound pressure may be reduced by the standing waves so that sound output characteristics may be deteriorated. That is, as illustrated in FIG. 9, a standing wave is generated by a traveling wave A from the central actuator C and a reflected wave B reflected from the second partition portion 600', which may deteriorate the low sound characteristics. Even in a corner area C, the traveling waves D and E are reflected obliquely, so that such a sound quality deterioration phenomenon may occur.

Particularly, because the output of the central actuator 200, which is responsible for the low sound, is larger and the distance to the partition portion 600 or 600' is close, the standing waves generated at horizontal direction points of the central area C (the areas indicated by dotted lines in FIG. 9) become the largest. That is, although the sound quality weakening phenomenon by the standing waves as described above may be generated in the left area L or the right area R, the sound waves of the low sound range in the central area C have a longer wavelength and a larger amplitude, and thus are more greatly affected by the standing waves.

Figure 10A:
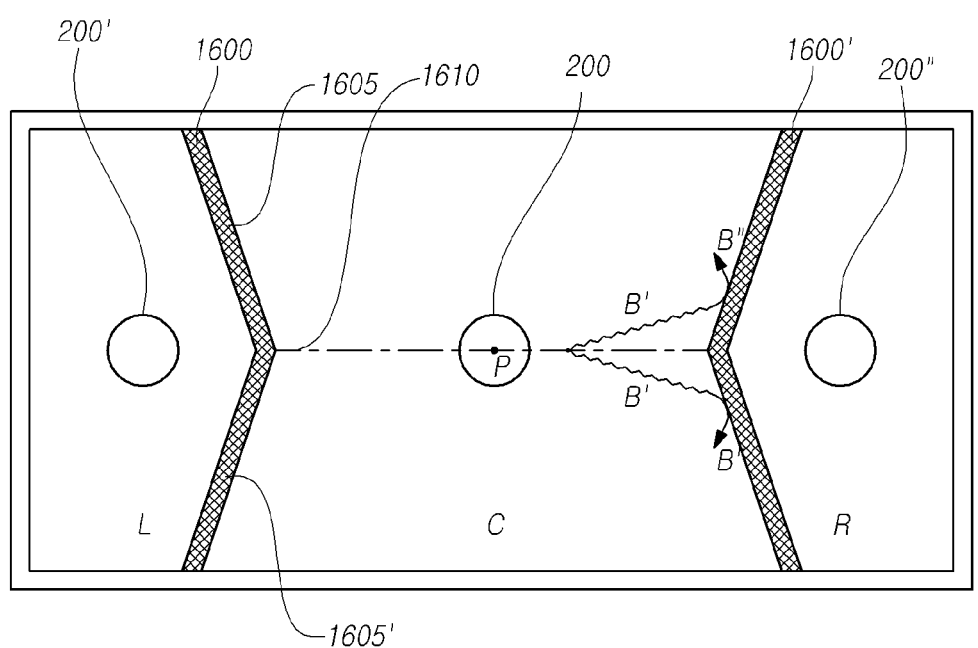
FIGS. 10A and 10B are views illustrating a structure of a display device according to another embodiment of the present disclosure in which sound separation partitions include a bent portion to reduce the influence of standing waves.
Figure 10B:
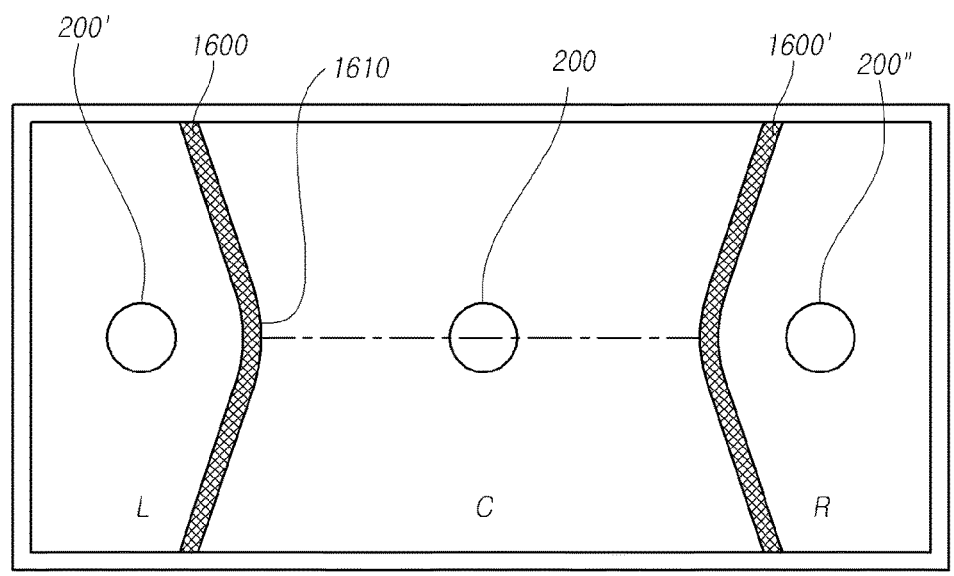

Thus, in another example embodiment of the present disclosure, as illustrated in FIGS. 10A and 10B and FIGS. 11A and 11B, the shape of the partition portions is changed to reduce the deterioration of the sound quality due to the standing waves. FIGS. 10A and 10B are views illustrating a structure of a display device according to another example embodiment of the present disclosure in which partition portions include a bent portion to reduce the influence of standing waves.

In FIGS. 10A and 10B, the first and second partition portions 1600 and 1600' have a shape including a bent portion 1610 bent in the middle portion, rather than a shape of a simple straight line. The bent portions 1610 of the first and second partition portions 1600 and 1600' may have the same vertical position as the center P of the central actuator 200 of low sound. That is, the end positions of the bent portions 1610 of the first and second partition portions 1600 and 1600' may be disposed on the same horizontal line as the center P of the central actuator 200.

As described above, when the first and second partition portions 1600 and 1600' are formed with bent portions, as illustrated in FIG. 10A, the traveling waves B' traveling in the horizontal direction from the central actuator 200 are obliquely reflected upward and downward so that the formation of standing waves due to superposition of the traveling waves B' and the reflected waves B" is reduced.

Therefore, the deterioration of a low sound characteristic due to the standing waves as described above can be suppressed.

As described above, the sound waves of the low sound range of the central area have a longer wavelength and larger amplitude compared to the sound waves generated in the left and right actuators for mid-high sound, the sound waves of the low sound range are more greatly affected by the standing waves.

Accordingly, as shown in FIGS. 10A and 10B, as the first and second partition portions 1600 and 1600' have the bent portions 1610 bent toward the center of the central actuator 200, the deterioration of sound quality due to standing waves of sound of the low sound range can be reduced. The bent portions of the first and second partition portions 1600 and 1600' do not necessarily have to be a linearly bent shape as illustrated in FIG. 10A, but may include a curved bent portion 1610 as illustrated in FIG. 10B.

However, as described above, because the first and second partition portions 1600 and 1600' are formed of a double-sided tape or the like, the linearly bent portions 1610 as illustrated in FIG. 10A may be more easily manufactured than the curved portion 1610 as illustrated in FIG. 10B. That is, in terms of assembly, it may be more advantageous that, as illustrated in FIG. 10A, each of the first and second partition portions 1600 and 1600' has first and second linear portions 1605 and 1605' extending at a particular angle with respect to the vertical direction, and a bent portion 1610 formed as a bent portion between the first and second linear portions 1605 and 1605'.

Figure 11A:
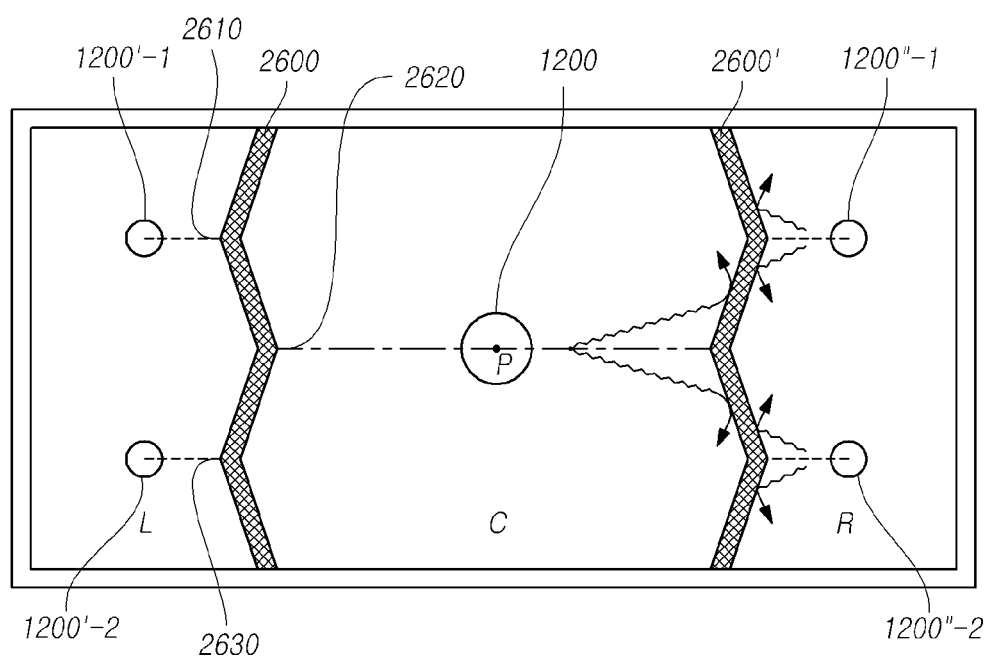
FIGS. 11A and 11B are views illustrating a structure of a display device according to still another embodiment of the present disclosure in which two or more separate actuators, such as a central actuator and left and right actuators, are provided, and the shapes of partition portions in that event.
Figure 11B:
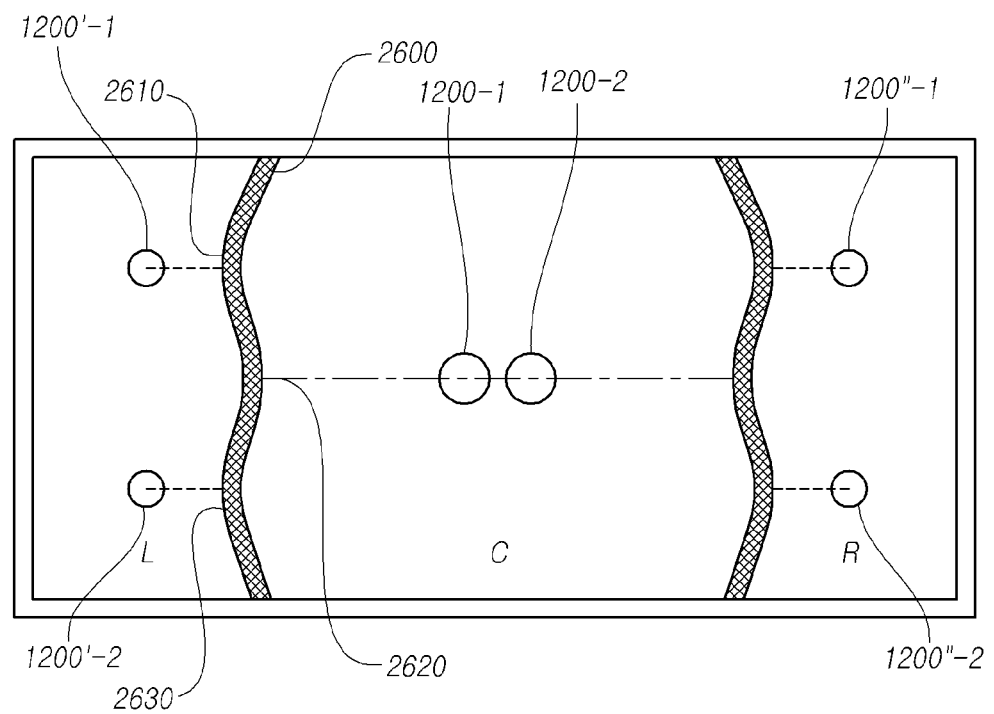

FIGS. 11A and 11B are views illustrating a structure of a display device according to still another embodiment of the present disclosure in which two or more separate actuators, such as a central actuator and left and right actuators, are provided, and the shapes of the partition portions.

In the embodiment of FIG. 2, descriptions have been made with respect to an example in which each of the actuators is configured as a single actuator. However, in the embodiment of FIGS. 11A and 11B, at least one of the central actuator, and the left and right actuators may include at least two or more sub-actuators that are disposed to be spaced apart from each other.

For example, the central actuator 1200 may be constituted by a single actuator disposed in the center of the central area C as illustrated in FIG. 11A, or may be constituted by two central sub-actuators 1200-1 and 1200-2 disposed to be horizontally adjacent to each other as illustrated in FIG. 11B. Also, the left actuator may be configured with two left sub actuators 1200'-1 and 1200'-2 disposed to be vertically spaced apart from each other within the left area L, and the right actuator may also have a configuration symmetrical to the left actuator, the right actuator includes right sub actuators 1200"-1 and 1200"-2.

In this case, the first or second partition portion 2600 or 2600' may be formed to have at least three bent portions, and each bent portion may be formed as a linear bent portion as illustrated in FIG. 11A or as a curved bent portion as illustrated in FIG. 11B. In the first partition portion 2600, a central second bent portion 2620 may be formed toward the center P of the central actuator 1200, a first upper bent portion 2610 may be formed toward the center of the left sub-actuator 1200'-1 disposed in the upper portion, and a lower third bent portion 2630 may be formed toward the center of the left sub actuator 1200'-2 disposed in the lower portion. That is, the end points of the first to third bent portions 2610, 2620, and 2630 are located at the same vertical positions as the centers of the upper left sub-actuator 1200'-1, the central actuator 1200, and the lower left sub-actuator 1200'-2.

With this configuration, as illustrated in FIG. 11A, traveling waves, which have traveled in the horizontal direction from the central actuator 1200, are dispersed and reflected vertically from the second bent portion 2620, and traveling waves, which have traveled in the horizontal direction from each of the left sub-actuators 1200'-1 and 1200'-2 are dispersed and reflected in the first bent portion 2610 and the third bent portion 2630, respectively. Thus, the formation of standing waves can be effectively suppressed in most or all the sound ranges.

As described above, in the embodiment illustrated in FIGS. 11A and 11B, each of the left and right actuators are constituted by two sub-actuators arranged to be vertically spaced apart from each other, and each partition portion is formed in a zigzag shape having at least three bent portions directed to the respective actuators so that it is possible to reduce the deterioration of the sound quality characteristic due to the standing waves in both the low sound range and mid-high sound range.

Figure 12A:
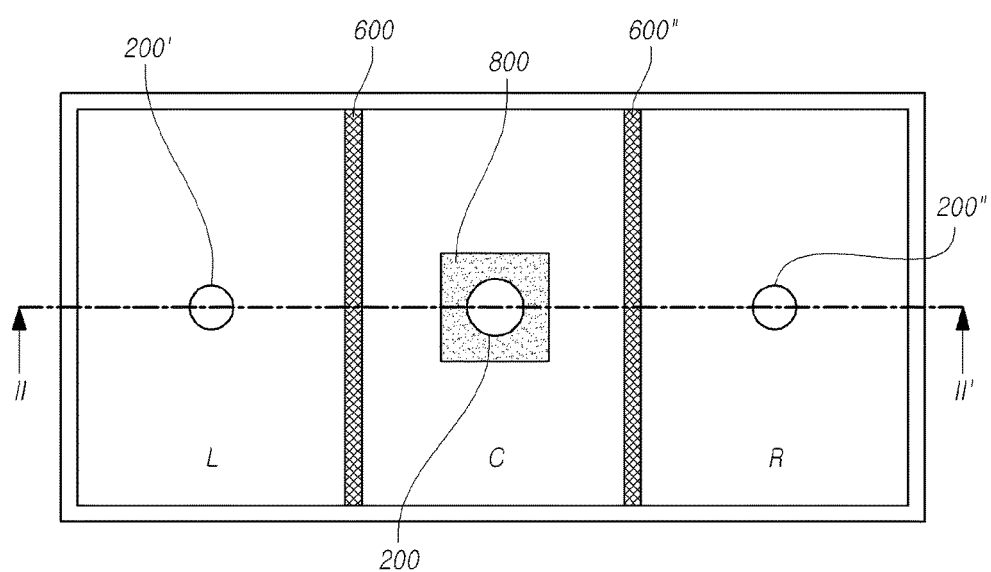
FIGS. 12A and 12B illustrate another embodiment of the present disclosure, which further includes a metal plate that improves a low sound characteristic and has a heat dissipating function.
Figure 12B:
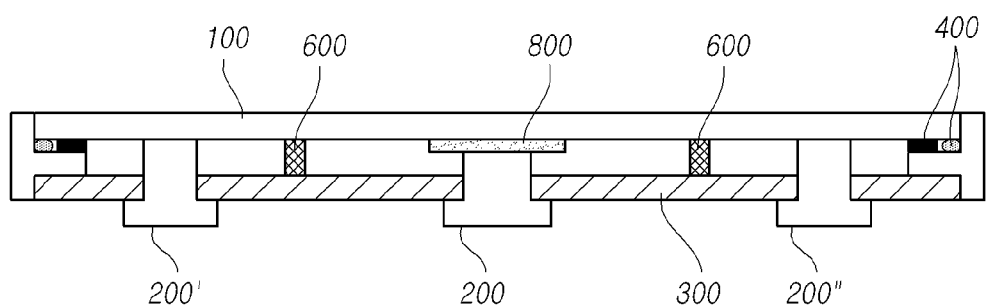

FIGS. 12A and 12B illustrate another example embodiment of the present disclosure, which further includes a metal plate that improves a low sound characteristic and has a heat dissipating function. FIG. 12B is a cross-section view taken along II-IF of FIG. 12A.

The display device according to FIGS. 12A and 12B may further include a metal plate 800 disposed around the central actuator 200. The metal plate 800 may be a heat-conductive plate-shaped member having a particular mass. The metal plate 800 may be attached to a portion of the display panel in the central area C and may be disposed such that the central actuator 200 is located at the center thereof.

When the strength of a sound generating vibration plate is 's' and the weight of the vibration plate is m, the lowest resonance frequency $f_0$ of the sound waves generated by the vibration of the vibration plate is determined by Equation 1 as follows.

$$f_0 = \frac{1}{2\pi} \times \sqrt{\frac{s}{m}} \qquad \text{Equation 1}$$

Accordingly, when the above-described metal plate 800 is used, the weight of the vibration plate increases in Equation 1, and as a result, the frequency of the generated sound waves can be reduced to further improve low sound characteristics.

As compared to the left and right actuators for mid-high sound, the central actuator may generate heat to a particular level or more due to a strong output. The metal plate 800 can absorb such heat to a certain extent.

Particularly, if the display panel 100 is an organic light emitting display (OLED) panel, because the organic light emitting material disposed therein could be vulnerable to heat, a performance deterioration may occur when the heat generated in the central actuator 200 is transferred to the organic light emitting material. Thus, the metal plate 800 according to the embodiment of FIG. 12 functions as a heat sink that dissipates heat generated in the central actuator 200 so that it becomes possible to prevent or reduce performance deterioration of the display panel.

The metal plate 800 may be formed of a metal material, such as aluminum, but is not limited thereto, and a heat-conductive material having a particular mass will suffice.

Further, the thickness, size, and the like of the metal plate 800 may be properly selected according to the degree of strengthening the low sound according to Equation 1. Also, it may be also desirable that the metal plate 800 is symmetrically disposed about the central actuator to enable uniform vibration of the vibration plate in the central area.

Figure 13A:
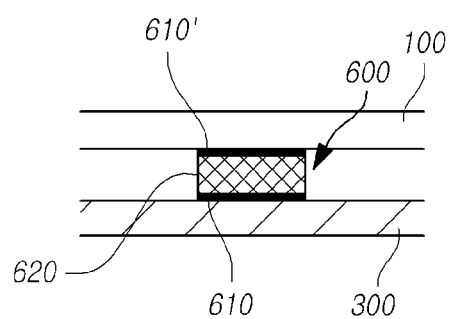
FIGS. 13A to 13C illustrate a detailed configuration of the partition portion according to an embodiment of the present disclosure.
Figure 13B:
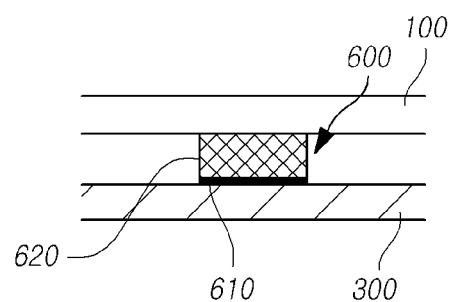
Figure 13C:
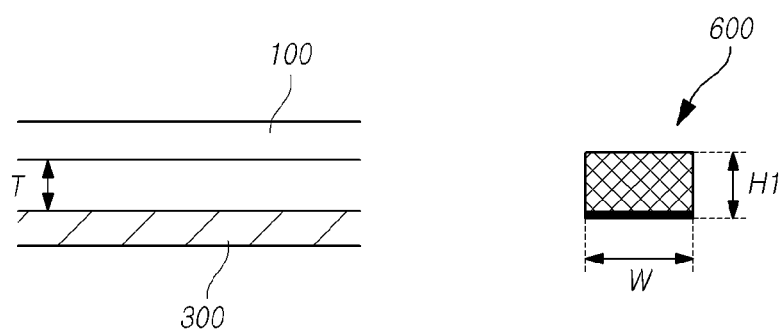

FIGS. 13A to 13C illustrates a detailed configuration of a partition portion according to the present embodiment. As described above, between the first and second partition portions, the first partition portion 600 will be representatively described.

As illustrated in FIGS. 13A to 13C, the first partition portion 600 is a partition structure extending in the vertical direction of the display panel 100 and disposed between the display panel 100 and a cover bottom 300 that is a rear support structure, and is provided to separate sound in the mid-high sound range generated from the left actuator and sound in the low sound range generated from the central actuator from each other to prevent the sound characteristics from being deteriorated due to the interference of both sounds. The first partition portion 600 may be formed of a foam pad or a one-sided or double-sided tape, and may be bonded to at least the upper surface of the cover bottom 300 and may be in contact with the low surface of the display panel 100 in a bonded or non-adhesive manner.

To improve low sound emission characteristics together with the sound separation function of the sound of the low sound range and the sound of the mid-high sound range, the first partition portion 600 may be in contact with the lower surface of the display panel 100 in a non-adhesive manner, and the height H1 of the first partition portion 600 may be equal to or larger than the gap T between the display panel 100 and the cover bottom 300, e.g., the width W of the first to third spaces 700, 700', and 700" as shown in FIG. 13C.

Meanwhile, the upper end surface of the first partition portion 600 may be in contact with the lower surface of the display panel 100, but it may be fixedly bonded to the lower surface of the display panel 100 or may be in contact with the lower surface of the display panel 100 without being bonded thereto. That is, in the embodiment of FIG. 13A, the first partition portion 600 may include a lower adhesive layer 610 bonded to the upper surface of the cover bottom 300, an upper adhesive layer 610' bonded to the lower surface of the display panel 100, and a partition layer 620 disposed between the two adhesive layers 610 and 610'. The partition portion 600 may be fixedly bonded to both the upper surface of the cover bottom 300 and the low surface of the display panel 100.

If the first partition portion 600 is bonded to both the cover bottom 300 and the display panel 100 as illustrated in FIG. 13A, the vibration of adjacent spaces is substantially absorbed so that the vibration of one space is not transmitted to the other space, which improves the sound separation characteristic of the low sound and the mid-high sound.

However, in the structure of FIG. 13A, because the vibrations of the first space and the second space are completely separated from each other, the size of a vibration plate may be reduced so that the sound pressure in the low sound range can be reduced.

The first partition portion 600 according to the embodiment of FIG. 13B includes only the lower adhesive layer 610 bonded to the upper surface of the cover bottom 300 and the partition layer 620 disposed above the lower adhesive layer 610 so that the partition portion 600 may be bonded only to the upper surface of the cover bottom 300 and may be in contact with the lower surface of the display panel 100 in a non-adhesive manner. That is, the upper end surface of the partition layer 620 of the partition portion 600 is in contact with the lower surface of the display panel 100, but is not bonded thereto.

According to the embodiment of FIG. 13B, by making the partition portion come in contact with the display panel 100 without being bonded thereto, when a weak vibration is generated for the purpose of outputting sound in the mid-high sound range, the partition portion 600 performs the sound separation function of the low sound and the mid-high sound, and when there is a strong vibration in the low sound range, thereby reducing the amount of vibration attenuation to maintain low frequency characteristics.

That is, according to the embodiment of FIG. 13B, the sound separation characteristic is ensured to be in the mid-high sound range, and the reduction of the sound pressure in the low sound range can be reduced by largely utilizing the vibration plate in the low sound range.

In other words, according to the embodiment of FIG. 13B, when the display panel vibrates weakly for outputting the sound of the mid-high sound range, the partition portion 600 substantially absorbs the vibration and maintains the sound separation characteristic of the low sound and the mid-high sound of the left side. When the diaphragm is strongly vibrated for outputting sound in the low sound range, the partition portion absorbs only a part of the vibration so that the entire display panel can be used as a vibration plate to maintain low sound characteristics.

As illustrated in FIG. 13C, the first partition portion 600 may have a height H1 that is larger than a gap T between the display panel 100 and the cover bottom 300. That is, as illustrated in FIG. 13C, when it is assumed that the gap between the display panel 100 and the cover bottom 300 is T in a state where the display panel 100 is coupled to the cover bottom 300, the height H1 of the first partition portion 600 may be equal to or larger than the gap T between the display panel 100 and the cover bottom 300. Here, the height H1 of the first partition portion 600 means the height before the first partition portion 600 is mounted between the display panel 100 and the cover bottom 300.

Accordingly, the first partition portion 600 may completely fill the gap between the display 100 panel and the cover bottom 300 such that the upper end surface of the first partition portion 600 comes into contact with the lower surface of the display panel 100, and when the display panel 100 and the cover bottom 300 are assembled to each other, the first partition portion 600 may be compressed to a certain extent.

As described above, by making the height H1 of the first partition portion 600 larger than the gap T between the display panel 100 and the cover bottom 300, the sound separation characteristics can be improved by the partition portion as described above. As should be recognized, the first partition portion 600 in this configuration may be compressed in an assembled device. Meanwhile, when the difference between the height H1 of the first partition portion 600 and the gap T between the display panel 100 and the cover bottom 300 is large, the sound separating characteristic may be improved and the sound distortion may be reduced, but the sound pressure in the low sound range may be reduced. On the contrary, when there is little difference between the height H1 of the first partition portion 600 and the gap T between the display panel 100 and the cover bottom 300, the sound pressure reduction in the low sound range may be decreased, but the sound separation characteristics may be deteriorated.

Accordingly, by appropriately adjusting the height H1 of the first partition portion 600 with respect to the gap T between the display panel 100 and the cover bottom 300, the sound pressure reduction phenomenon and sound distortion phenomenon in the low sound range can be reduced while maintaining the sound separation characteristic.

The first partition portion 600 has a particular width W, which may be determined to be about 8 mm to 12 mm. When the width W of the first partition portion 600 is increased, the sound separation characteristic may be improved. Consequently, the sound output amount may be reduced by reducing the right and left vibration width, and when the width W is reduced, the desired sound separation characteristic may not be maintained.

Accordingly, by adjusting the width W of the first partition portion to about 8 mm to 12 mm, the sound pressure reduction can be avoided or reduced while maintaining the sound separation characteristic.

Figure 14A:
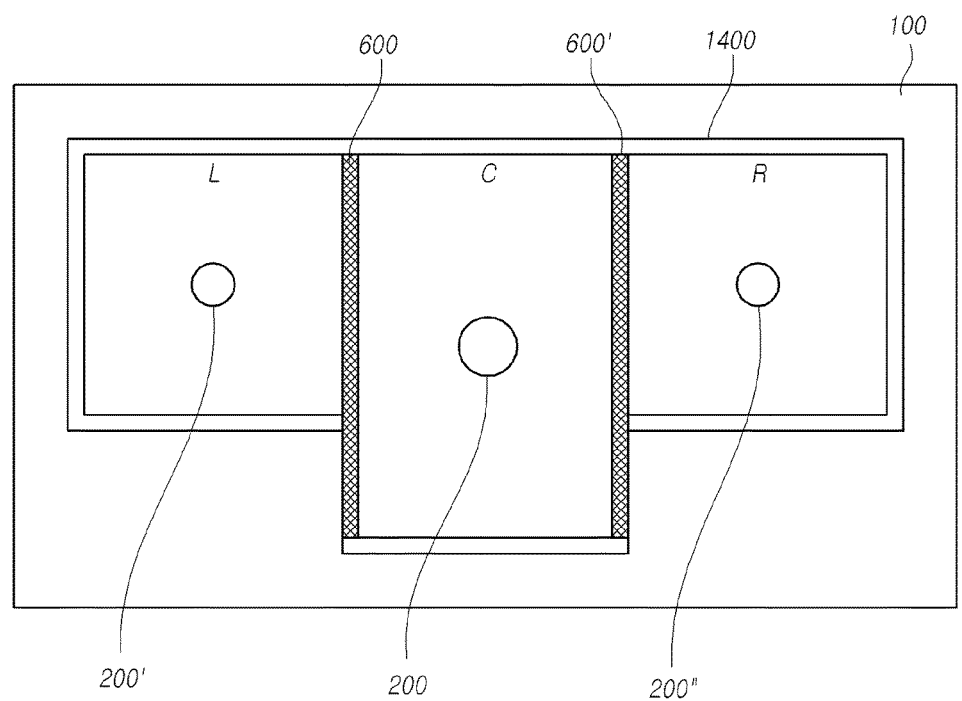
FIGS. 14A and 14B illustrate yet another embodiment of the present disclosure, in which FIG. 14A exemplifies a structure in which a baffle part is disposed inside the display panel.
Figure 14B:
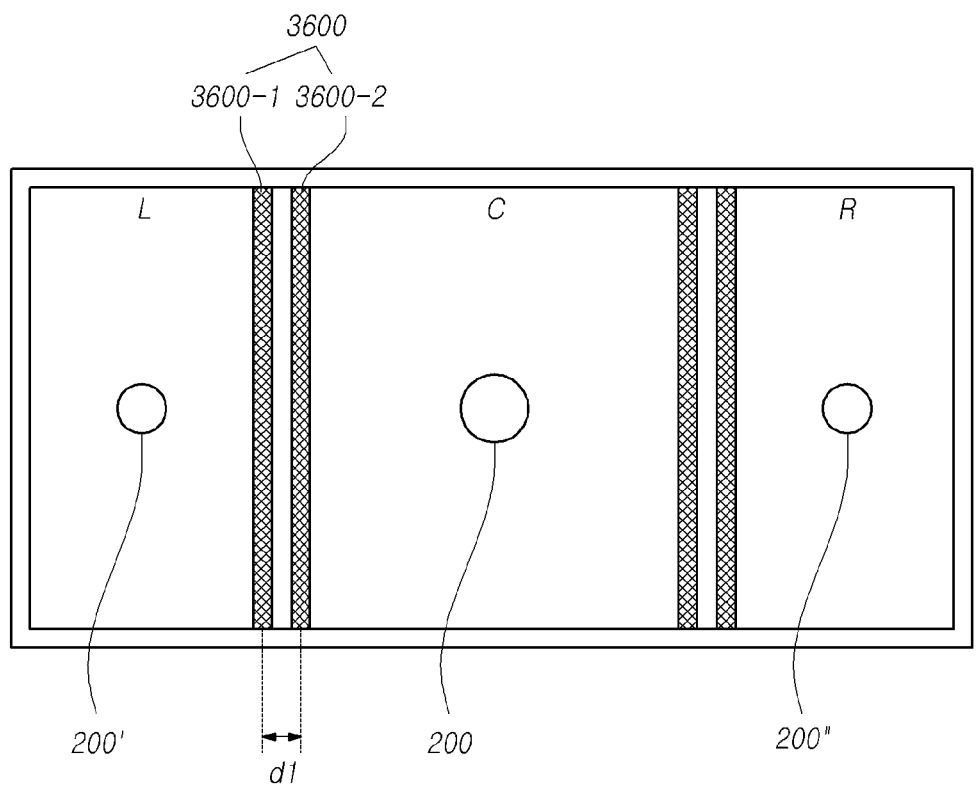

FIGS. 14A and 14B illustrate another example embodiment of the present disclosure, in which FIG. 14A exemplifies a structure in which a baffle part is disposed inside the display panel, and FIG. 14B illustrates an example in which the partition portions has a multi-wall structure.

Although the above-described embodiment exemplifies a configuration in which the baffle part 400 is disposed along the edge of the display panel, the present disclosure is not necessarily limited to such a configuration. The baffle part 1400 may be disposed inside the display panel as illustrated in FIG. 14A. In this case, the baffle part 1400 may be disposed between the display panel 100 and the cover bottom to be separated from the middle cabinet, and may include a double wall structure including an adhesive portion and a sealing portion outside the adhesive portion as described above.

The actuators may be positioned at the centers of the central area, the left area, and the right area, respectively. That is, when each actuator is disposed at the center of the corresponding area as described above, the most excellent vibrating characteristic may be obtained because the sizes of all the vibration spaces are the same. However, depending on the size of the display panel, the central area and the left and right areas may not have a square shape.

In such a case, as illustrated in FIG. 14A, by disposing the baffle part 1400 inside the display panel 100 rather than the peripheral edge of the display panel 100, the central area C and the right and left areas L and R may be formed to have a square shape, and each of the actuators may be arranged at the vertical symmetrical positions of each of the corresponding areas.

In this way, by adjusting the positions of the baffle part and the partitions portions such that the central actuator 200 and the left and right actuators 200' and 200" can be disposed at the central positions of the central area C, the left area L, and the right area R, respectively, it is possible not only to improve a stereo sound implementation characteristic, but also to prevent unbalanced vibration to improve the durability of the display device and the reliability of the sound output.

As illustrated in FIG. 14B, the first partition portion 3600 may be implemented as a double-wall structure including two sub-partitions portions 3600-1 and 3600-2.

Generally, there is a difference between the resonance frequency of the low sound generated in the central area C and the resonance frequency of the mid-high sound generated in the left and right areas L and R, and there is a possibility that sound waves having different frequencies interfere with each other to adversely affect mutual sound characteristics.

Accordingly, to further ensure the sound separation characteristic of the central area and the left and right areas, it is possible to adopt a double-wall structure in which two or more sub-partition portions having the same structure are arranged in parallel to be spaced apart by a particular distance as illustrated in FIG. 14B. In this case, as the distance dl between the plurality of sub-partition portions increases, the sound separation characteristic is improved. However, because the vibration area in each area is reduced, the sound pressure may be reduced, and thus, the distance dl between the adjacent sub-partition portions may be adjusted to about 5 mm to 15 mm.

That is, as illustrated in FIG. 14B, when the first partition portion is configured as a double-wall structure, and the distance dl between the sub-partition portions is adjusted to about 5 mm to 15 mm, the sound separation characteristic of the low sound area and the mid-high sound area can be further improved without reducing the sound pressure.

As described above, a display device can be provided with excellent sound characteristics in a wide sound range by disposing a low-sound actuator as well as left and right actuators for mid-high sound in the central area of a display panel, disposing the left area and right area with reference to the center area, respectively, and generating sound by vibrates the display panel by each actuator in the corresponding area.

Thus, a panel vibration type display device may include a central actuator for low sound, which is arranged in a central area of the display panel, left and right actuators for mid-high sound, which are disposed in the left area and the right area with reference to the central area, partition portions disposed between the central area and the left area and between the central area and the right area, respectively, and a baffle part disposed along a peripheral edge of the central area and the left and right areas, thereby enabling excellent low sound and stereo sound implementation. Further, a display device can prevent deterioration of a sound quality characteristic by reflected waves or standing waves that may be generated in respective areas by optimizing the shape of the partition portions that separate the central area and the left and right areas to be interconnected with an actuator position. Also, a display device may have excellent central low sound implementation characteristics and left and right stereo sound implementation characteristics by adjusting the height and number of partition portions that separate the center area and left and right areas, and determining whether to bond the partition portions to the display panel.

According to one or more example embodiments of the present disclosure, a display device includes a display panel having first, second, and third areas, at least three sound generating actuators including first, second, and third actuators each spaced apart from the other two in a long axis direction of the display panel, wherein the first, second, and third actuators each contact the display panel at the first, second, and third areas, respectively, to generate sound by vibrating the display panel, and a support structure at a rear side of the display panel configured to support the at least three sound generating actuators.

According to one or more example embodiments of the present disclosure, the display may further include a first partition configured to separate the first and the second areas, and a second partition configured to separate the second and the third areas.

According to one or more example embodiments of the present disclosure, the first partition may extend in a direction crossing the long axis direction and contact at least one of the display panel and the support structure.

According to one or more example embodiments of the present disclosure, the second partition may extend in a direction crossing the long axis direction and contact at least one of the display panel and the support structure.

According to one or more example embodiments of the present disclosure, the second area may include a central portion of the display device and the central portion may be larger than each of the first and third areas.

According to one or more example embodiments of the present disclosure, the first and third areas may be respectively to the right and to the left of the second area.

According to one or more example embodiments of the present disclosure, a threshold frequency of a low frequency range of the second actuator may be lower than a threshold frequency of a low frequency range of each of the first actuator and the third actuator.

According to one or more example embodiments of the present disclosure, each of the first partition and the second partition may include a bent portion bent toward the second actuator.

According to one or more example embodiments of the present disclosure, an end position of the bent portion may be disposed on a line in the long axis direction that passes through a center of the second actuator.

According to one or more example embodiments of the present disclosure, at least three sound generating actuators may further include fourth and fifth actuators respectively disposed in the first and third areas.

According to one or more example embodiments of the present disclosure, the fourth actuator may be below the first actuator, and the fifth actuator may be below the third actuator.

According to one or more example embodiments of the present disclosure, the first partition may include a first bent portion bent toward the first actuator, a second bent portion bent toward the second actuator, and a third bent portion bent toward the fourth actuator.

According to one or more example embodiments of the present disclosure, the first partition may be arranged in a zigzag form such that the end position of the first bent portion is directed to the first actuator, the end position of the second bent portion may be directed toward the second actuator, and the end position of the third bent portion maybe directed toward the fourth actuator.

According to one or more example embodiments of the present disclosure, the second partition may include a fourth bent portion bent toward the third actuator, a fifth bent portion bent toward the second actuator, and a sixth bent portion bent toward the fifth actuator, and the second partition may be arranged in a zigzag form such that the end position of the fourth bent portion may be directed to the third actuator, the end position of the fifth bent portion may be directed toward the second actuator, and the end position of the sixth bent portion may be directed toward the fifth actuator.

According to one or more example embodiments of the present disclosure, the at least three sound generating actuators may further include a sixth actuator disposed in the second area.

According to one or more example embodiments of the present disclosure, each of the first partition and the second partition may be arranged in a zigzag form.

According to one or more example embodiments of the present disclosure, the display device may further include a metal plate disposed adjacent to the second actuator.

According to one or more example embodiments of the present disclosure, the metal plate may be configured to conduct heat from the second actuator and may be attached to a portion of the display panel in the second area.

According to one or more example embodiments of the present disclosure, the first partition and the second partition may be disposed between the support structure and the display panel, and the first partition and the second partition may be bonded to at least the support structure.

According to one or more example embodiments of the present disclosure, the display device may further include a baffle disposed to surround each of the first, second, and third actuators with the first and second partitions to define first, second, and third spaces respectively around first, second, and third actuators.

According to one or more example embodiments of the present disclosure, the baffle may include at least one of an adhesive portion and a sealing portion.

According to one or more example embodiments of the present disclosure, the support structure may include first, second, and third support holes into which the first, second, and third actuators are respectively inserted such that the first, second, and third actuators are fixed to the support structure.

According to one or more example embodiments of the present disclosure, an apparatus includes a display panel configured to display images, and a plurality of actuators operatively connected with the display panel and configured to provide vibrations to the display panel to emit sound from the display panel propagating out along a viewing direction of the display panel.

According to one or more example embodiments of the present disclosure, the display panel may include a matrix of pixels defining a row direction and a column direction, the plurality of actuators being aligned in at least one of the row direction and the column direction.

According to one or more example embodiments of the present disclosure, the plurality of actuators may include one or more of first actuators located at a central region of the display panel and two or more of second actuators located at two or more regions different from the central region.

According to one or more example embodiments of the present disclosure, the apparatus may further include at least one partition between the first and second actuators or between two second actuators to provide a first compartment for the two or more first actuators and a second compartment for the one or more second actuators, the first and second compartments cooperating with the first and second actuators to generate the sounds emitted from the display panel.

According to one or more example embodiments of the present disclosure, the at least one partition extends substantially in the column direction.

According to one or more example embodiments of the present disclosure, at least one first actuator in the first compartment and at least one second actuator in the second compartments that are adjacent to the first compartment in a left location and a right location thereof may be aligned in the row direction.

According to one or more example embodiments of the present disclosure, the two or more of the second actuators may be aligned in the column direction.

According to one or more example embodiments of the present disclosure, the at least one of the first and second actuators may be in direct contact with a lower surface of the display panel.

According to one or more example embodiments of the present disclosure, the first actuators and the first compartment may cooperate to generate sound of a lower level compared to sound generated by the second actuators cooperating with the second compartment.

According to one or more example embodiments of the present disclosure, the at least one of the partitions may have a bent structure configured to enhance acoustic characteristics for the sound generated by the first and second actuators cooperating with the first and second compartments.

According to one or more example embodiments of the present disclosure, at least one of the first and second compartments may be substantially sealed.

According to one or more example embodiments of the present disclosure, the display panel may include organic light emitting diodes (OLEDs), and the apparatus may further comprise one or more heat dissipation members configured to conduct heat from at least one of the first and second actuators.

According to one or more example embodiments of the present disclosure, a display device includes a display panel having at least first and second areas, at least two sound generating actuators including first and second actuators spaced apart from each other in a long axis direction of the display panel, wherein the first and second actuators each contact the display panel at the first and second areas, respectively, to generate sound by vibrating the display panel, a support structure at a rear side of the display panel configured to support the at least two sound generating actuators, and a first partition configured to separate the first and second areas.

According to one or more example embodiments of the present disclosure, the display panel may further include a third area, and the display device may further comprise a second partition configured to separate the second and the third areas.

According to one or more example embodiments of the present disclosure, each of the first and second partitions may have a multi-wall structure in which two or more sub-partition portions with substantially the same structure are arranged in parallel.

Configurations in accordance with embodiments of the present disclosure may provide a number of attributes. For example, a panel vibration type display device generates sound by directly vibrating a display panel constituting the display device, and outputting sound in the low sound range from a central area and sound in the mid-high sound range from left and right areas. Further, a panel vibration type display device may include a central actuator for low sound, which is arranged in a central area of the display panel, left and right actuators for mid-high sound, which are disposed in a left area and a right area with reference to the central area, sound partition portions disposed between the central area and the left area and between the central area and the right area, respectively, and a baffle part disposed along a peripheral edge of the central area and the left and right areas, thereby implementing excellent low sound and stereo sound. Also, a display device can prevent deterioration of sound quality characteristics due to reflected waves or standing waves that may be generated in respective areas by optimizing the shape of the partition portions that separate the central area and the left and right areas to be interlocked with an actuator position. A display device can provide excellent central low sound characteristics as well as left and right stereo sound implementation characteristics by adjusting the height and number of partition portions that separate the center area and left and right areas, and determining whether to bond the partition portions to the display panel.

Additionally, a display device can provide excellent sound characteristics over a wide sound range by disposing a low-sound actuator, and left and right actuators for mid-high sound in the central area of a display panel, disposing the left area and right area with reference to the center area, respectively, and generating sound by vibrating the display panel using each actuator in the corresponding area. In example embodiments, a panel vibration type display device may include a central actuator for low sound, which is arranged in a central area of the display panel, left and right actuators for mid-high sound, which are disposed in the left area and the right area with reference to the central area, partition portions disposed between the central area and the left area and between the central area and the right area, respectively, and a baffle part disposed along a peripheral edge of the central area and the left and right areas, thereby enabling improved low sound and stereo sound implementation. Moreover, a display device can reduce deterioration of sound quality characteristics due to reflected waves or standing waves that may be generated in respective areas by optimizing the shape of the partition portions that separate the central area and the left and right areas to be interlocked with an actuator position. Also, a display device can achieve excellent low sound characteristics as well as left and right stereo sound implementation characteristics by adjusting the height and number of partition portion that separate the center area and left and right areas, and determining whether to bond the partition portions to the display panel.

It will be apparent to those skilled in the art that various modifications and variations can be made in the panel vibration type sound generating display device of the present disclosure without departing from the technical idea or scope of the disclosure. Thus, it is intended that the present disclosure cover the modifications and variations of this disclosure provided they come within the scope of the appended claims and their equivalents.

What is claimed is:

1. A display device, comprising:
 a display panel having first, second, and third areas;
 at least three sound generating actuators including first, second, and third actuators each spaced apart from the other two in a long axis direction of the display panel, wherein the first, second, and third actuators each directly contact the display panel at the first, second, and third areas, respectively, to generate sound by vibrating the display panel;
 a support structure at a rear side of the display panel configured to support the at least three sound generating actuators;
 a first partition configured to separate the first and the second areas; and
 a second partition configured to separate the second and the third areas,
 wherein each of the first partition and the second partition includes a bent portion bent toward the second actuator, and an end position of the bent portion is disposed on a line in the long axis direction that passes through a center of the second actuator.

2. The display device of claim 1, wherein the first partition extends in a direction crossing the long axis direction and contacts at least one of the display panel and the support structure.

3. The display device of claim 1, wherein each of the first partition and the second partition extends in a direction crossing the long axis direction and has a height larger than or equal to a gap between the support structure and the display panel such that each of the first partition and the second partition contacts the display panel and the support structure.

4. The display device of claim 1, wherein the second area includes a central portion of the display device and the central portion is larger than each of the first and third areas.

5. The display device of claim 4, wherein the first and third areas are respectively to the right and to the left of the second area.

6. The display device of claim 1, wherein a threshold frequency of a low frequency range of the second actuator is lower than a threshold frequency of a low frequency range of each of the first actuator and the third actuator.

7. The display device of claim 1, wherein each of the first partition and the second partition is arranged in a zigzag form.

8. The display device of claim 1, further comprising a metal plate disposed adjacent to the second actuator.

9. The display device of claim 8, wherein the metal plate is configured to conduct heat from the second actuator and is attached to a portion of the display panel in the second area.

10. The display device of claim 1, wherein the first partition and the second partition are disposed between the support structure and the display panel, and wherein the first partition and the second partition are bonded to at least the support structure.

11. The display device of claim 1, further comprising a baffle disposed to surround each of the first, second, and third actuators with the first and second partitions to define first, second, and third spaces respectively around first, second, and third actuators.

12. The display device of claim 11, wherein the baffle includes at least one of an adhesive portion and a sealing portion.

13. The display device of claim 1, wherein the support structure includes first, second, and third support holes into which the first, second, and third actuators are respectively inserted such that the first, second, and third actuators are fixed to the support structure.

14. A display device, comprising:
a display panel having first, second, and third areas;
at least three sound generating actuators including first, second, and third actuators each spaced apart from the other two in a long axis direction of the display panel, wherein the first, second, and third actuators each directly contact the display panel at the first, second, and third areas, respectively, to generate sound by vibrating the display panel;
a support structure at a rear side of the display panel configured to support the at least three sound generating actuators;
a first partition configured to separate the first and the second areas; and
a second partition configured to separate the second and the third areas,
wherein at least three sound generating actuators further includes fourth and fifth actuators respectively disposed in the first and third areas,
wherein the fourth actuator is below the first actuator, and wherein the fifth actuator is below the third actuator,
wherein the first partition includes a first bent portion bent toward the first actuator, a second bent portion bent toward the second actuator, and a third bent portion bent toward the fourth actuator.

15. The display device of claim 14, wherein the first partition is arranged in a zigzag form such that the end position of the first bent portion is directed to the first actuator, the end position of the second bent portion is directed toward the second actuator, and the end position of the third bent portion is directed toward the fourth actuator.

16. The display device of claim 15, wherein the second partition includes a fourth bent portion bent toward the third actuator, a fifth bent portion bent toward the second actuator, and a sixth bent portion bent toward the fifth actuator, and
wherein the second partition is arranged in a zigzag form such that the end position of the fourth bent portion is directed to the third actuator, the end position of the fifth bent portion is directed toward the second actuator, and the end position of the sixth bent portion is directed toward the fifth actuator.

17. The display device of claim 14, wherein the at least three sound generating actuators further includes a sixth actuator disposed in the second area.

* * * * *